US012630377B2

(12) United States Patent
Iwata et al.

(10) Patent No.: US 12,630,377 B2
(45) Date of Patent: May 19, 2026

(54) CONTAINER PROCESSING APPARATUS

(71) Applicant: Daifuku Co., Ltd., Osaka (JP)

(72) Inventors: Masashige Iwata, Hinocho (JP);
Kazunari Kimura, Hinocho (JP);
Takashi Hirata, Hinocho (JP)

(73) Assignee: Daifuku Co., Ltd., Osaka (JP)

( * ) Notice: Subject to any disclaimer, the term of this
patent is extended or adjusted under 35
U.S.C. 154(b) by 36 days.

(21) Appl. No.: 18/721,787

(22) PCT Filed: Dec. 15, 2022

(86) PCT No.: PCT/JP2022/046237
§ 371 (c)(1),
(2) Date: Jan. 13, 2025

(87) PCT Pub. No.: WO2023/120380
PCT Pub. Date: Jun. 29, 2023

(65) Prior Publication Data
US 2025/0145397 A1 May 8, 2025

(30) Foreign Application Priority Data

Dec. 22, 2021 (JP) ................................. 2021-208043

(51) Int. Cl.
*B65G 60/00* (2006.01)
*B65G 57/30* (2006.01)
*B65G 59/06* (2006.01)

(52) U.S. Cl.
CPC ........... *B65G 60/00* (2013.01); *B65G 57/308*
(2013.01); *B65G 59/066* (2013.01);
(Continued)

(58) Field of Classification Search
CPC .............................. B65G 60/00; B65G 61/00;
B65G 2814/0304; B65G 2814/0308;
(Continued)

(56) References Cited

U.S. PATENT DOCUMENTS 4,460,169 A * 7/1984 Bartesaghi ............. B65H 29/40
271/217
4,915,578 A * 4/1990 Becker ................. B65G 59/066
221/253

(Continued)

FOREIGN PATENT DOCUMENTS

DE 1106250 5/1961
JP 01268198 A * 10/1989
(Continued)

*Primary Examiner* — Gregory W Adams
(74) *Attorney, Agent, or Firm* — The Webb Law Firm

(57) ABSTRACT

Each first locking unit of a pair of first locking units (11) is
positioned in such a manner that a plurality of first locking
portions (14) are respectively locked to side surfaces of a
plurality of containers (90) included in a stacked container
group arranged in a container group arrangement region (A),
in a state where the first locking portions (14) are lined up
along an up-down direction (V) and face the container group
arrangement region (A). Each second locking unit of a pair
of second locking units (21) is positioned in such a manner
that a second locking portion (24) is locked to a side surface
of the lowest container (90) of the stacked container group
arranged in the container group arrangement region (A), in
a state where the second locking portion faces the container
group arrangement region (A).

8 Claims, 19 Drawing Sheets

(52) U.S. Cl.
    CPC ............... *B65G 2201/0235* (2013.01); *B65G
        2814/0304* (2013.01); *B65G 2814/0308*
        (2013.01)

(58) Field of Classification Search
    CPC .... B65G 59/061; B65G 59/063; B65G 59/06;
        B65G 59/106; B65G 59/12; B65G
        1/0492; B65G 1/0407; B65G 1/065;
        B65G 57/30; B65G 57/305; B65G
        57/306; B65G 57/308; B65G 59/066;
        B65G 59/107; B65G 15/14; B65G 15/16;
        B65G 15/12; B65G 15/10
    USPC ............ 414/798, 797.5, 795.2, 795.6, 798.4;
        198/626.1, 626.5, 626.3
    See application file for complete search history.

(56)                References Cited

U.S. PATENT DOCUMENTS 4,955,783 A * 9/1990 Grazia .................... B65B 35/52
                                                    414/795

| | | | | |
|---|---|---|---|---|
| 5,278,410 | A * | 1/1994 | Boutet ................. | G03B 42/045 |
| | | | | 250/589 |
| 5,584,477 | A * | 12/1996 | Sakai ................... | B41F 23/0443 |
| | | | | 271/240 |
| 5,645,392 | A * | 7/1997 | Leichty ................ | B65G 59/063 |
| | | | | 414/416.01 |
| 7,637,712 | B2 * | 12/2009 | Varney ................... | B07C 3/008 |
| | | | | 414/795.2 |
| 7,942,398 | B1 * | 5/2011 | Marcinik ................ | B43M 3/04 |
| | | | | 270/58.01 |
| 8,154,314 | B2 * | 4/2012 | Shim .................. | G01R 31/2893 |
| | | | | 324/750.13 |
| 10,947,067 | B1 * | 3/2021 | Gupta .................... | B65G 47/24 |
| 2010/0104412 | A1 * | 4/2010 | Abascal Albizu ... | A22C 7/0053 |
| | | | | 414/795.2 |
| 2025/0051110 | A1 * | 2/2025 | Iwata ................... | B65G 57/308 |

FOREIGN PATENT DOCUMENTS

| | | |
|---|---|---|
| JP | 7251941 A | 10/1995 |
| JP | 3047732 U | 2/1998 |
| JP | 2006240845 A | 9/2006 |

* cited by examiner

Fig.3

CONTAINER PROCESSING APPARATUS

CROSS-REFERENCE TO RELATED APPLICATIONS

This application is the United States national phase of International Patent Application No. PCT/JP2022/046237 filed Dec. 15, 2022, and claims priority to Japanese Patent Application No. 2021-208043 filed Dec. 22, 2021, the disclosures of which are hereby incorporated by reference in their entireties.

BACKGROUND OF THE INVENTION

Field of the Invention

The present invention relates to a container processing apparatus that executes at least one of: stacking processing for generating a stacked container group by sequentially stacking a plurality of containers; and unstacking processing for sequentially separating containers from a stacked container group composed of a plurality of containers stacked on each other.

Description of Related Art

Registered Japanese Utility Model No. 3047732 discloses an example of such a container processing apparatus. In the following description of the background art, reference numbers used in Registered Japanese Utility Model No. 3047732 are shown in parentheses. Registered Japanese Utility Model No. 3047732 discloses, as a container processing apparatus that executes unstacking processing, an unstacker that sequentially separates containers (1) from a multilayer container group composed of a plurality of containers (1) stacked on each another. In an embodiment shown in FIGS. 1 to 5 of Registered Japanese Utility Model No. 3047732, the unstacker includes a pair of left and right vertical belts (2A, 2B) for sandwiching the multilayer container group and is configured to sequentially place the lowest container (1) onto conveyor belts (3) by rotating the pair of left and right vertical belts (2A, 2B) to move the multilayer container group sandwiched therebetween downward. The conveyor belts (3) are respectively disposed on the left side and the right side of a lifter table (7) that can be lifted and lowered, and the unstacker is configured to lower the lowest container (1) separated from the multilayer container group while supporting the container (1) on the lifter table (7) and place the container (1) onto the conveyor belts (3).

As described above, the container processing apparatus disclosed in Registered Japanese Utility Model No. 3047732 includes a lifting table (the lifter table in Registered Japanese Utility Model No. 3047732) that is lifted and lowered while supporting the lowest container of a stacked container group. The lifting table makes it possible to smoothly transfer the lowest container of the stacked container group to a conveyor device (the conveyor belts in Registered Japanese Utility Model No. 3047732) without lowering the stacked container group to the conveyor device every time the lowest container is separated as in an embodiment shown in FIGS. 6 and 7 of Registered Japanese Utility Model No. 3047732. However, the lifting table needs to be lifted and lowered every time the lowest container of the stacked container group is separated, and accordingly, the lifting and lowering operations of the lifting table may hinder improvement in the efficiency of the unstacking processing. Also, the conveyor device needs to be configured in such a manner that the lifting table for supporting a container can be disposed at a center region in the left-right direction as in the container processing apparatus disclosed in Registered Japanese Utility Model No. 3047732 in which the conveyor belts are respectively disposed on the left side and the right side of the lifting table.

SUMMARY OF THE INVENTION

Therefore, there is demand for realizing a container processing apparatus capable of smoothly transferring the lowest container of a stacked container group between a conveyor device and the stacked container group held above the conveyor device when executing stacking processing or unstacking processing, even without providing a lifting table that is lifted and lowered while supporting the lowest container of the stacked container group.

A container processing apparatus according to the present disclosure is configured to execute at least one of: stacking processing for generating a stacked container group by sequentially stacking a plurality of containers; and unstacking processing for sequentially separating the containers from the stacked container group composed of the plurality of containers stacked on each other, the container processing apparatus including: a conveyor device configured to convey the containers placed on a placement plane in a conveying direction that intersects an up-down direction; a first lifting device positioned in such a manner as to hold, lift, and lower the containers above the placement plane and configured to hold, lift, and lower the stacked container group; and a second lifting device positioned in such a manner as to hold, lift, and lower the containers above the placement plane and configured to hold, lift, and lower a lowest container of the stacked container group, wherein the container processing apparatus further includes a container group arrangement region in which the stacked container group is arranged above the placement plane, the first lifting device includes: a pair of first locking units facing each other and sandwiching the container group arrangement region therebetween; and a first drive unit configured to drive the pair of first locking units, the first locking units each include a first endless member wound around a pair of first rotary members spaced apart from each other in the up-down direction; and a plurality of first locking portions fixed to an outer circumferential portion of the first endless member at a constant interval along an extending direction of the first endless member, the first drive unit drives a pair of the first endless members included in the pair of first locking units in such a manner that the first endless members rotate synchronously with each other, the second lifting device includes: a pair of second locking units facing each other and sandwiching the container group arrangement region therebetween; and a second drive unit configured to drive the pair of second locking units, the second locking units each include: a second endless member wound around a pair of second rotary members spaced apart from each other in the up-down direction; and a second locking portion fixed to an outer circumferential portion of the second endless member, the second drive unit drives a pair of the second endless members included in the pair of second locking units in such a manner that the second endless members rotate synchronously with each other, each first locking unit of the pair of first locking units is positioned in such a manner that the plurality of first locking portions are respectively locked to side surfaces of the plurality of containers included in the stacked container group arranged in the container group arrangement region, in a state where the first locking portions are lined up along the up-down direction and face the container group arrangement region, each second locking unit of the pair of second locking units is positioned in such a manner that the second locking portion is locked to a side surface of the lowest container of the stacked container group arranged in the container group arrangement region, in a state where the second locking portion faces the container group arrangement region, and the first drive unit and the second drive unit are configured to operate independently of each other.

According to this configuration, it is possible to collectively hold, lift, and lower the plurality of containers included in the stacked container group with use of the first lifting device, and hold, lift, and lower only the lowest container of the stacked container group with use of the second lifting device. Moreover, the first drive unit and the second drive unit are configured to operate independently of each other in this configuration, and therefore, the pair of first locking units of the first lifting device and the pair of second locking units of the second lifting device can be caused to operate independently of each other. Accordingly, when the lowest container of the stacked container group held above the conveyor device by the first lifting device is to be placed onto the placement plane (i.e., the unstacking processing) or when a container placed on the placement plane is to be added as the lowest container to the stacked container group held above the conveyor device by the first lifting device (i.e., the stacking processing), it is possible to smoothly transfer the lowest container between the stacked container group and the conveyor device with use of the second lifting device.

As described above, according to this configuration, it is possible to smoothly transfer the lowest container between the conveyor device and a stacked container group held above the conveyor device in the stacking processing or the unstacking processing, even if the container processing apparatus does not include a lifting table that is lifted and lowered while supporting the lowest container of a stacked container group.

Further features and advantages of the container processing apparatus will be more apparent from the following description of embodiments referring to the drawings.

BRIEF DESCRIPTION OF THE DRAWINGS

FIG. 3 is a longitudinal cross-sectional view of the container processing apparatus according to the embodiment.

DESCRIPTION OF THE INVENTION

Figure 1:
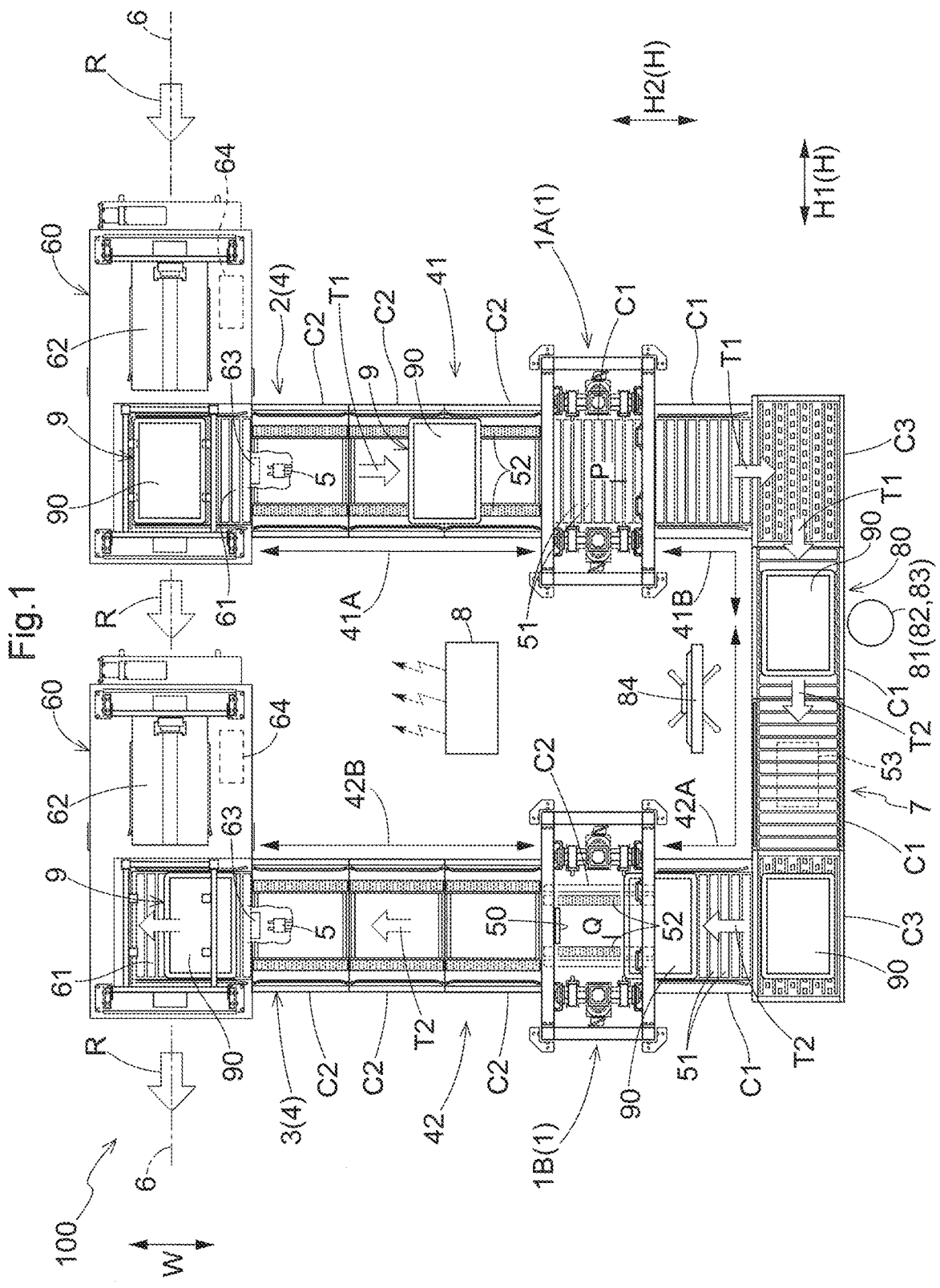
FIG. 1 is a plan view of a container processing facility according to an embodiment.

The following describes an embodiment of a container processing apparatus with reference to the drawings. Here, a case is described as an example in which a container processing apparatus according to the present disclosure is applied to an example of a container processing facility shown in FIG. 1. In the present embodiment, a first rotation axis X1 corresponds to a "rotation axis of a first rotary member", and a second rotation axis X2 corresponds to a "rotation axis of a second rotary member".

In a container processing facility 100, a stacked container group 9 composed of a plurality of containers 90 stacked on each other is transferred between the container processing facility 100 and a transport vehicle 60 that transports the stacked container group 9, and processing is performed on the containers 90 included in the stacked container group 9. The processing performed on the containers 90 of the stacked container group 9 includes work that is performed in a work station 80, which will be described later, on the containers 90 separated from the stacked container group 9.

Figure 6:
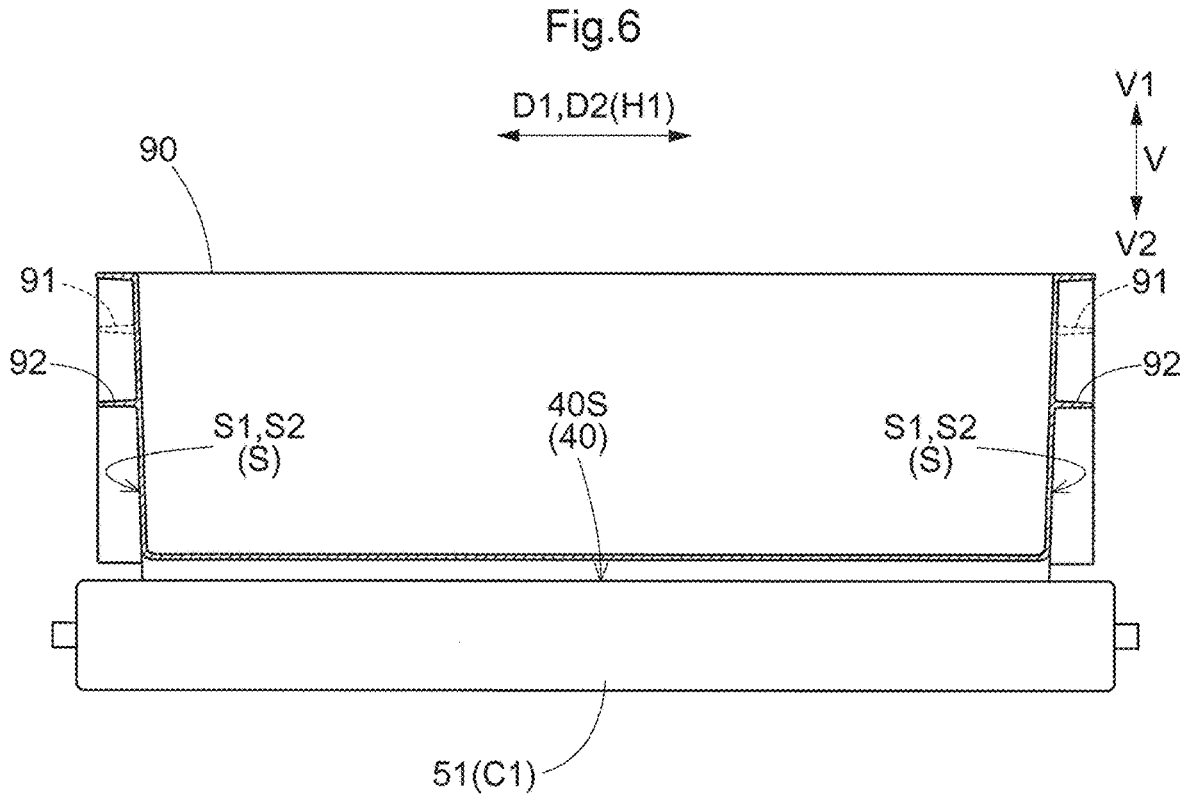
FIG. 6 is a cross-sectional view of the container according to the embodiment.

The containers 90 are capable of being stacked (i.e., piled) on each other in an up-down direction V (vertical direction). As shown in FIG. 6, each container 90 has a box shape and is open upward. As shown in FIG. 1, each container 90 has a rectangular shape as viewed in the up-down direction V (in a plan view) in the present embodiment. Each container 90 is capable of being stacked on another container 90 with a bottom portion of the container 90 fitted into the upper opening of the other container 90. In the present embodiment, each container 90 is capable of being stacked on another container 90 that contains an object (not shown). A stacked container group 9 is obtained by sequentially stacking a plurality of containers 90 by fitting the bottom portion of each container 90 into the upper opening of another container 90.

The transport vehicle 60 transports the stacked container group 9 by traveling along a prescribed travel path 6. In the present embodiment, the transport vehicle 60 is configured to travel on a floor surface. The transport vehicle 60 includes a power storage device 64 (e.g., a lithium ion battery) that is chargeable from the outside, and a driving unit (e.g., an electric motor) that generates driving force for causing the transport vehicle 60 to travel operates with power supplied from the power storage device 64. The travel path 6 of the transport vehicle 60 may be formed physically with use of a rail or the like or may be set virtually. In the present embodiment, the travel path 6 is set virtually.

As shown in FIG. 1, the transport vehicle 60 includes a support portion 61 that supports the stacked container group 9. That is to say, the containers 90 stacked on each other are supported by the support portion 61. In the present embodiment, the support portion 61 includes a conveyor (a roller conveyor in the example shown in FIG. 1) for conveying the stacked container group 9 in a vehicle left-right direction (a horizontal direction H that is orthogonal to a traveling direction of the transport vehicle 60), and the support portion 61 is formed on the conveyor. By operating the conveyor provided in the support portion 61, it is possible to move the stacked container group 9 between the support portion 61 and the outside of the transport vehicle 60 (e.g., a loading section 2 or an unloading section 3, which will be described later). The conveyor provided in the support portion 61 (specifically, a drive unit of the conveyor, such as an electric motor) operates with power supplied from the power storage device 64.

In the present embodiment, the transport vehicle 60 includes a transfer device 62 for transferring the containers 90 between the support portion 61 and transfer target locations. In the present embodiment, the container processing facility 100 includes a container shelf for housing containers 90, and the travel path 6 of the transport vehicle 60 is set via the container shelf, although this is not shown in the drawings. The transfer target locations of the containers 90 transferred by the transfer device 62 include the container shelf, and the transfer device 62 transfers containers 90 housed in the container shelf to the support portion 61 and transfers containers 90 supported by the support portion 61 to the container shelf. The transport vehicle 60 takes out containers 90 included in a stacked container group 9 that is to be conveyed to the loading section 2, which will be described later, from the container shelf with use of the transfer device 62 and houses containers 90 included in a stacked container group 9 conveyed from the unloading section 3, which will be described later, in the container shelf with use of the transfer device 62. The transfer device 62 (specifically, a drive unit of the transfer device 62, such as an electric motor) operates with power supplied from the power storage device 64.

As shown in FIG. 1, the container processing facility 100 includes the loading section 2 that receives a stacked container group 9 from the transport vehicle 60, the unloading section 3 from which a stacked container group 9 is transferred to the transport vehicle 60, the work station 80, an unstacking device 1A, a stacking device 1B, a first conveyor device 41, and a second conveyor device 42. In the example shown in FIG. 1, only one work station 80 is provided on a conveyance path of containers 90 or a stacked container group 9 between the loading section 2 and the unloading section 3, but a configuration is also possible in which a plurality of work stations 80 are provided on the conveyance path of containers 90 or a stacked container group 9 between the loading section 2 and the unloading section 3.

The container processing facility 100 includes a control device 8, which is simply shown in FIG. 1. Each function of the control device 8 is realized through cooperation between hardware such as an arithmetic processing device and a program executed by the hardware. The control device 8 does not necessarily need to be constituted by a single piece of hardware and may also be constituted by a set of multiple pieces of hardware (multiple pieces of hardware separate from each other) capable of performing wired or wireless communication with each other.

The control device 8 controls operations of sections of the container processing facility 100. Specifically, control units (device controllers) provided in the sections of the container processing facility 100 control driving of driving force sources (e.g., electric motors) respectively provided in the sections in accordance with instructions from the control device 8, and thus operations of the sections of the container processing facility 100 are controlled. The operations of the sections of the container processing facility 100 controlled by the control device 8 include: an operation for receiving a stacked container group 9 from the transport vehicle 60 by the loading section 2; an operation for transferring a stacked container group 9 to the transport vehicle 60 by the unloading section 3; an unstacking operation (an operation for performing unstacking processing) performed by the unstacking device 1A; a stacking operation (an operation for performing stacking processing) performed by the stacking device 1B; an operation for conveying a container 90 or a stacked container group 9 by the first conveyor device 41; and an operation for conveying a container 90 or a stacked container group 9 by the second conveyor device 42. In a case where a work device 82, which will be described later, is disposed in the work station 80, the operations of the sections of the container processing facility 100 controlled by the control device 8 include an operation for performing work on a container 90 by the work device 82. In a case where an output device 84, which will be described later, is disposed in the work station 80, the operations of the sections of the container processing facility 100 controlled by the control device 8 include an operation for outputting a work instruction by the output device 84.

The loading section 2 is adjacent to the travel path 6 of the transport vehicle 60. Specifically, the loading section 2 is adjacent to the travel path 6 in a path width direction W that is orthogonal to both the up-down direction V and a travel direction R extending along the travel path 6. In FIG. 1, the position of the right transport vehicle 60 of the illustrated two transport vehicles 60 is the position on the travel path 6 corresponding to the loading section 2. Note that, in descriptions referring to the drawings in the present specification, "up", "down", "left", and "right" indicate those directions as viewed with the drawings oriented in such a manner that the reference sings in the drawings can be read. In the state where the transport vehicle 60 is stopped at the position on the travel path 6 corresponding to the loading section 2, the loading section 2 receives a stacked container group 9 from the transport vehicle 60. In the present embodiment, the loading section 2 includes a conveyor (a belt conveyor C2 in the example shown in FIG. 1) for conveying the stacked container group 9 in the horizontal direction H. When the loading section 2 receives the stacked container group 9 from the transport vehicle 60, the conveyor provided in the loading section 2 and the conveyor provided in the support portion 61 of the transport vehicle 60 are operated to move the stacked container group 9 from the transport vehicle 60 (specifically, the support portion 61) to the loading section 2.

The unloading section 3 is adjacent to the travel path 6 of the transport vehicle 60. Specifically, the unloading section 3 is adjacent to the travel path 6 in the path width direction W. When a section of the travel path 6 extending straight as viewed in the up-down direction is referred to as a "straight section", the loading section 2 and the unloading section 3 are respectively adjacent to different portions of the same straight section in the travel direction R in the example shown in FIG. 1. In FIG. 1, the position of the left transport vehicle 60 of the illustrated two transport vehicles 60 is the position on the travel path 6 corresponding to the unloading section 3. In the state where the transport vehicle 60 is stopped at the position on the travel path 6 corresponding to the unloading section 3, the unloading section 3 transfers a stacked container group 9 to the transport vehicle 60. In the present embodiment, the unloading section 3 includes a conveyor (a belt conveyor C2 in the example shown in FIG. 1) for conveying the stacked container group 9 in the horizontal direction H. When the unloading section 3 transfers the stacked container group 9 to the transport vehicle 60, the conveyor provided in the unloading section 3 and the conveyor provided in the support portion 61 of the transport vehicle 60 are operated to move the stacked container group 9 from the unloading section 3 to the transport vehicle 60 (specifically, the support portion 61).

As shown in FIG. 1, in the present embodiment, the loading section 2 and the unloading section 3 are disposed on the same side of the travel path 6 in the path width direction W. The loading section 2 and the unloading section 3 are at the same position in the path width direction W and spaced apart from each other in the travel direction R. That is to say, the loading section 2 and the unloading section 3 are provided side by side with a distance therebetween in the travel direction R.

As shown in FIG. 1, in the present embodiment, the distance between the loading section 2 and the unloading section 3 in the travel direction R is set in such a manner that a transport vehicle 60 (the right transport vehicle 60 in FIG. 1) transferring a stacked container group 9 to the loading section 2 and another transport vehicle 60 (the left transport vehicle 60 in FIG. 1) receiving a stacked container group 9 from the unloading section 3 can be arranged next to each other in the travel direction R without interfering with each other. In the example shown in FIG. 1, the distance between the loading section 2 and the unloading section 3 in the travel direction R is set in such a manner that it is not possible to arrange another transport vehicle 60 between the transport vehicle 60 transferring a stacked container group 9 to the loading section 2 and the transport vehicle 60 receiving a stacked container group 9 from the unloading section 3. Unlike the example shown in FIG. 1, it is also possible to set the distance between the loading section 2 and the unloading section 3 in the travel direction R in such a manner that it is possible to arrange one or more transport vehicles 60 between the transport vehicle 60 transferring a stacked container group 9 to the loading section 2 and the transport vehicle 60 receiving a stacked container group 9 from the unloading section 3.

In the present embodiment, at least one of the loading section 2 and the unloading section 3 is a target section 4 that includes a power supply portion 5 for supplying power to a transport vehicle 60 that is stopped to transfer a stacked container group 9 to the target section 4 or receive a stacked container group 9 from the target section 4. In the example shown in FIG. 1, both the loading section 2 and the unloading section 3 are the target section 4 and include the power supply portion 5. Unlike the example shown in FIG. 1, a configuration is also possible in which only one of the loading section 2 and the unloading section 3 is the target section 4 and includes the power supply portion 5.

As shown in FIG. 1, each transport vehicle 60 includes a power receiving portion 63 that is electrically connected to the power storage device 64. Power is supplied from the power supply portion 5 to the transport vehicle 60 in a state where the power supply portion 5 and the power receiving portion 63 are electrically connected, and the power storage device 64 is charged with the supplied power. In the example shown in FIG. 1, the power supply portion 5 is provided on a lower side V2 of a surface of the target section 4 for supporting a stacked container group 9 (specifically, a conveyance plane of the conveyor provided in the target section 4), and the power receiving portion 63 is provided on the lower side V2 of a surface of the support portion 61 of the transport vehicle 60 for supporting a stacked container group 9 (specifically, a conveyance plane of the conveyor provided in the support portion 61).

In the example shown in FIG. 1, power is supplied from the power supply portion 5 to the transport vehicle 60 (specifically, the power receiving portion 63) with use of a contact method (a wired method). Therefore, after the transport vehicle 60 is stopped at the target section 4, at least one of the power supply portion 5 and the power receiving portion 63 is moved to electrically connect a power supply terminal included in the power supply portion 5 and a power receiving terminal included in the power receiving portion 63 in a contact manner, and power is supplied from the power supply portion 5 to the transport vehicle 60 in this state. Unlike the example shown in FIG. 1, a configuration is also possible in which power is supplied from the power supply portion 5 to the transport vehicle 60 (specifically, the power receiving portion 63) with use of a contactless method (a wireless method) such as an electromagnetic induction method or a magnetic resonance method. In this case, power is supplied from the power supply portion 5 to the transport vehicle 60 in a state where a power supply coil included in the power supply portion 5 and a power receiving coil included in the power receiving portion 63 are electrically connected in a contactless manner.

The work device 82 or the output device 84 is disposed in the work station 80. The work device 82 is a device for performing a work on the containers 90. The output device 84 is a device for giving work instructions to a worker 83 who performs the work on the containers 90. As illustrated simply in FIG. 1, a work subject 81 that includes at least one of the work device 82 and the worker 83 is disposed in the work station 80. In a case where the work subject 81 includes the worker 83, the output device 84 is disposed in the work station 80. The output device 84 is, for example, a display (monitor) for displaying the work instructions on a screen. Note that the output device 84 may also be a monitor of a portable terminal held by the worker 83 or a smart glass (a display device integrated with an eyeglass) worn by the worker 83.

In the present embodiment, picking is performed in the work station 80 to take out objects contained in a container 90 from the container 90. In the picking, the objects contained in the container 90 are taken out via the upper opening of the container 90. The objects taken out from the container 90 are placed into a shipment container, for example. In the case where the work device 82 is disposed in the work station 80, the work device 82 is a picking device (a picking robot) that takes out objects from a container 90. In the case where the output device 84 is disposed in the work station 80, the work instructions output from the output device 84 include the number of objects to be taken out from the container 90.

The first conveyor device 41 is a device for conveying a stacked container group 9 received from the transport vehicle 60 at the loading section 2 to the unstacking device 1A and conveying containers 90 sequentially separated from the stacked container group 9 by the unstacking device 1A to the work station 80. In the present embodiment, the first conveyor device 41 conveys the containers 90 or the stacked container group 9 along a horizontal plane. That is to say, in the present embodiment, a first conveying direction T1 that is the conveying direction of the first conveyor device 41 is a horizontal direction H. Here, as shown in FIG. 1, a section of the first conveyor device 41 between the loading section 2 and the unstacking device 1A will be referred to as a "first upstream section 41A", and a section of the first conveyor device 41 between the unstacking device 1A and the work station 80 will be referred to as a "first downstream section 41B". Note that the unstacking device 1A is not included in the first upstream section 41A and the first downstream section 41B. A plurality of containers 90 stacked on each other are collectively conveyed in the first upstream section 41A, and the containers 90 are conveyed one by one in the first downstream section 41B.

The second conveyor device 42 is a device for conveying the containers 90 from the work station 80 to the stacking device 1B and conveying a stacked container group 9 generated by sequentially stacking the plurality of containers 90 in the stacking device 1B to the unloading section 3. In the present embodiment, the second conveyor device 42 conveys the containers 90 or the stacked container group 9 along a horizontal plane. That is to say, in the present embodiment, a second conveying direction T2 that is the conveying direction of the second conveyor device 42 is a horizontal direction H. Here, as shown in FIG. 1, a section of the second conveyor device 42 between the work station 80 and the stacking device 1B will be referred to as a "second upstream section 42A", and a section of the second conveyor device 42 between the stacking device 1B and the unloading section 3 will be referred to as a "second downstream section 42B". Note that the stacking device 1B is not included in the second upstream section 42A and the second downstream section 42B. The containers 90 are conveyed one by one in the second upstream section 42A, and the plurality of containers 90 are collectively conveyed by being stacked on each other in the second downstream section 42B.

As shown in FIG. 1, a particular horizontal direction H (here, a horizontal direction H that is parallel to the travel direction R) will be referred to as a "first horizontal direction H1", and a horizontal direction H that is orthogonal to the first horizontal direction H1 (here, a horizontal direction H that is parallel to the path width direction W) will be referred to as a "second horizontal direction H2". As shown in FIG. 1, in the present embodiment, the first conveyor device 41 and the second conveyor device 42 are arranged in such a manner that the conveyance path of containers 90 or a stacked container group 9 between the loading section 2 and the unloading section 3 has an angular U-shape as viewed in the up-down direction. The unstacking device 1A is disposed in one of the two mutually-facing side portions of the U-shape, the stacking device 1B is disposed in the other side portion of the U-shape, and the work station 80 is disposed in a bottom portion of the U-shape. In the present embodiment, the unstacking device 1A and the stacking device 1B are disposed at the same position in the second horizontal direction H2.

The first upstream section 41A is arranged so as to convey a stacked container group 9 along the second horizontal direction H2 away from the travel path 6. The first downstream section 41B is arranged so as to convey containers 90 along the second horizontal direction H2 away from the travel path 6 and then convey the containers 90 along the first horizontal direction H1 toward the work station 80. The second upstream section 42A is arranged so as to convey the containers 90 along the first horizontal direction H1 away from the work station 80 and then convey the containers 90 along the second horizontal direction H2 toward the travel path 6. The second downstream section 42B is arranged so as to convey the containers 90 (specifically, a stacked container group 9) along the second horizontal direction H2 toward the travel path 6.

In the present embodiment, the first conveyor device 41 and the second conveyor device 42 include roller conveyors C1, belt conveyors C2, and direction change conveyors C3. As shown in FIG. 1, each roller conveyor C1 includes a plurality of rollers 51 that are driven to rotate. A plane (a virtual plane) including respective upper ends of the plurality of rollers 51 constitutes a conveyance plane of the roller conveyor C1. As shown in FIG. 1, each belt conveyor C2 includes belts 52 that are driven to rotate (driven to circulate). Upper surfaces of the belts 52 constitute a conveyance plane of the belt conveyor C2. In the present embodiment, each belt conveyor C2 is a belt conveyor (a double belt conveyor) that includes two (a pair of) belts 52 separately disposed on two sides in a conveyance width direction (a direction that is orthogonal to the conveying direction as viewed in the up-down direction). Each direction change conveyor C3 is capable of changing the conveying direction by 90 degrees as viewed in the up-down direction. Although descriptions of details are omitted, each direction change conveyor C3 includes a first conveying unit that conveys containers 90 in the first horizontal direction H1 and a second conveying unit that conveys the containers 90 in the second horizontal direction H2. Each direction change conveyor C3 is configured to convey the containers 90 in the first horizontal direction H1 by raising the first conveying unit up to the conveyance plane and lowering the second conveying unit from the conveyance plane, and convey the containers 90 in the second horizontal direction H2 by raising the second conveying unit up to the conveyance plane and lowering the first conveying unit from the conveyance plane.

In the present embodiment, the first upstream section 41A is configured in such a manner that a plurality of stacked container groups 9 can be arranged next to each other in the conveying direction (i.e., in the first conveying direction T1). In the example shown in FIG. 1, the first upstream section 41A includes three belt conveyors C2 arranged in the conveying direction and is configured in such a manner that three stacked container groups 9 can be separately disposed on the three belt conveyors C2. That is to say, the first upstream section 41A is configured in such a manner that three stacked container groups 9 can be arranged next to each other in the conveying direction. Note that the most upstream belt conveyor C2 of the three belt conveyors C2 in the first conveying direction T1 is provided in the loading section 2. Also, these three belt conveyors C2 are capable of performing conveying operations independently of each other.

In the example shown in FIG. 1, the three belt conveyors C2 included in the first upstream section 41A are capable of performing conveying operations independently of a roller conveyor C1 provided at an unstacking target location P (see FIG. 1), which will be described later. Therefore, in the present embodiment, it is possible to convey and stop a stacked container group 9 in the first upstream section 41A without affecting the unstacking processing performed by the unstacking device 1A.

Also, in the example shown in FIG. 1, the first downstream section 41B includes a roller conveyor C1, a direction change conveyor C3, and a roller conveyor C1 in this order from the upstream side along the conveying direction (i.e., the first conveying direction T1). These three conveyors included in the first downstream section 41B are capable of performing conveying operations independently of the roller conveyor C1 provided at the unstacking target location P. Therefore, in the present embodiment, it is possible to convey and stop containers 90 in the first downstream section 41B without affecting the unstacking processing performed by the unstacking device 1A. Note that, out of these three conveyors, the most downstream conveyor in the first conveying direction T1 is provided in the work station 80.

In the present embodiment, the second downstream section 42B is configured in such a manner that a plurality of stacked container groups 9 can be arranged next to each other in the conveying direction (i.e., in the second conveying direction T2). In the example shown in FIG. 1, the second downstream section 42B includes three belt conveyors C2 arranged in the conveying direction and is configured in such a manner that three stacked container groups 9 can be separately disposed on the three belt conveyors C2. That is to say, the second downstream section 42B is configured in such a manner that three stacked container groups 9 can be arranged next to each other in the conveying direction. Note that, out of the three belt conveyors C2, the most downstream conveyor in the second conveying direction T2 is provided in the unloading section 3. Also, these three belt conveyors C2 are capable of performing conveying operations independently of each other.

In the example shown in FIG. 1, the three belt conveyors C2 included in the second downstream section 42B are capable of performing conveying operations independently of a belt conveyor C2 provided at a stacking target location Q (see FIG. 1), which will be described later. Therefore, in the present embodiment, it is possible to convey and stop a stacked container group 9 in the second downstream section 42B without affecting the stacking processing performed by the stacking device 1B.

Also, in the example shown in FIG. 1, the second upstream section 42A includes two roller conveyors C1, a direction change conveyor C3, and a roller conveyor C1 in this order from the upstream side along the conveying direction (i.e., the second conveying direction T2). These four conveyors included in the second upstream section 42A are capable of performing conveying operations independently of the belt conveyor C2 provided at the stacking target location Q. Therefore, in the present embodiment, it is possible to convey and stop containers 90 in the second upstream section 42A without affecting the stacking processing performed by the stacking device 1B. Note that, out of the four conveyors, the most upstream conveyor in the second conveying direction T2 is provided in the work station 80.

In the example shown in FIG. 1, a common conveyor (in this example, a roller conveyor C1) is used as the conveyor included in the first downstream section 41B and provided in the work station 80 and the conveyor included in the second upstream section 42A and provided in the work station 80. The first conveyor device 41 and the second conveyor device 42 are distinguished from each other at least conceptually and may also be configured to include a common device (here, the roller conveyor C1) as in the example shown in FIG. 1.

As shown in FIG. 1, in the present embodiment, a weighing section 7 for measuring the weight of a container 90 that is being conveyed by the second conveyor device 42 is provided in a region between the work station 80 and the stacking device 1B on the conveyance path of the second conveyor device 42. Note that the "region between the work station 80 and the stacking device 1B on the conveyance path of the second conveyor device 42" includes the work station 80. As illustrated simply in FIG. 1, the weighing section 7 includes a weighing device 53 that measures the weight of a container 90 placed on a conveyance plane 42S of the second conveyor device 42. In the example shown in FIG. 1, the weighing section 7 is located downstream of the work station 80 in the second conveying direction T2. Specifically, the weighing section 7 is provided at the roller conveyor C1 that is adjacent to the downstream side of the roller conveyor C1 provided in the work station 80 in the second conveying direction T2.

In the present embodiment, information indicating the weight of the container 90 measured at the weighing section 7 is transmitted to the control device 8, and the control device 8 performs an inspection based on the weight of the container 90 measured at the weighing section 7 to confirm whether or not the work was appropriately performed in the work station 80. As described above, in the present embodiment, picking is performed in the work station 80 to take out objects contained in a container 90 from the container 90. Accordingly, if the weight of the container 90 measured at the weighing section 7 corresponds to a determination reference weight that is a weight obtained by subtracting the total weight of objects to be taken out from the container 90 from the weight of the container 90 before picking is performed, the control device 8 determines that the work was appropriately performed in the work station 80. Note that, if the weighing section 7 is provided in the work station 80, the control device 8 determines that the work performed in the work station 80 is complete when the weight of the container 90 measured at the weighing section 7 corresponds to the determination reference weight described above.

The unstacking device 1A performs the unstacking processing for sequentially separating containers 90 from a stacked container group 9. The unstacking device 1A executes the unstacking processing on a stacked container group 9 placed at the unstacking target location P (see FIG. 1) on the conveyance path of the first conveyor device 41. On the other hand, the stacking device 1B performs the stacking processing for generating a stacked container group 9 by sequentially stacking a plurality of containers 90 on each other. The stacking device 1B executes the stacking processing on a container 90 placed at the stacking target location Q (see FIG. 1) on the conveyance path of the second conveyor device 42.

As shown in FIG. 1, in the present embodiment, at least a portion of the first conveyor device 41 including the unstacking target location P is constituted by the roller conveyor C1. When compared with a case where the portion of the first conveyor device 41 including the unstacking target location P is constituted by a belt conveyor C2, this configuration makes it easier to move a stacked container group 9 in the conveyance width direction (a direction orthogonal to the first conveying direction T1 as viewed in the up-down direction) at the unstacking target location P. Therefore, when a stacked container group 9 conveyed to the unstacking target location P is positioned in the conveyance width direction before the unstacking processing is performed by the unstacking device 1A, for example, it is easy to adjust the position of the stacked container group 9 in the conveyance width direction.

As described above, in the example shown in FIG. 1, a portion of the first downstream section 41B also includes the roller conveyors C1. Accordingly, in the example shown in FIG. 1, the portion of the first conveyor device 41 including the unstacking target location P and the portion of the first downstream section 41B are constituted by the roller conveyors C1.

As shown in FIG. 1, in the present embodiment, at least a portion of the second conveyor device 42 including the stacking target location Q is constituted by the belt conveyor C2. When compared with a case where the portion of the second conveyor device 42 including the stacking target location Q is constituted by a roller conveyor C1, this configuration makes it easier to suppress slippage between a stacked container group 9 and the second conveyor device 42 at the stacking target location Q. Therefore, even if a stacked container group 9 generated by the stacking device 1B is heavy, it is possible to suppress slippage between the stacked container group 9 and the second conveyor device 42 and appropriately convey the stacked container group 9 from the stacking target location Q.

As described above, in the example shown in FIG. 1, the belt conveyors C2 are also provided in the entire second downstream section 42B. Accordingly, in the example shown in FIG. 1, the portion of the second conveyor device 42 including the stacking target location Q and the entire second downstream section 42B are constituted by the belt conveyors C2.

Figure 12:
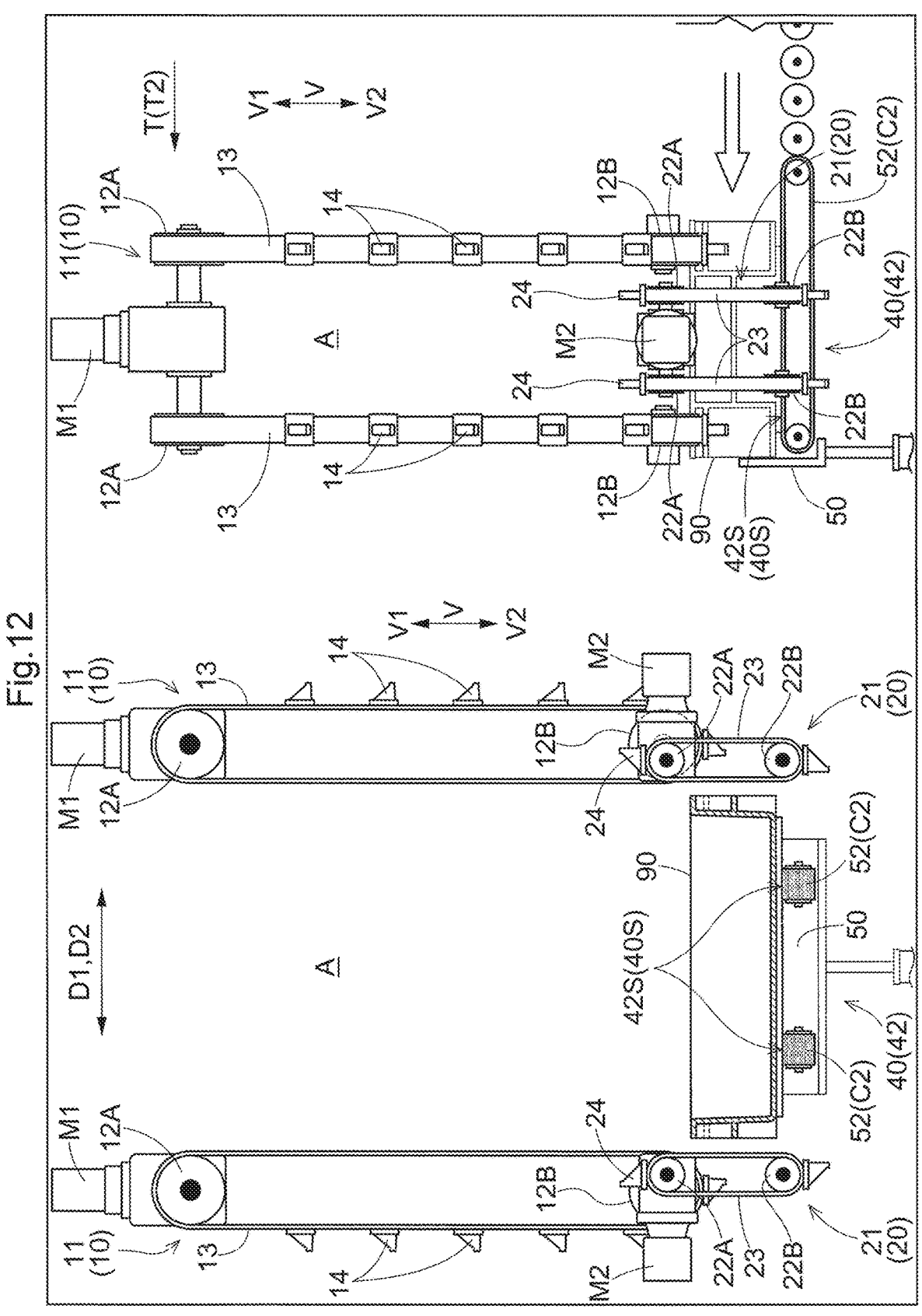
FIG. 12 is a diagram showing stacking processing according to an embodiment.
Figure 20:
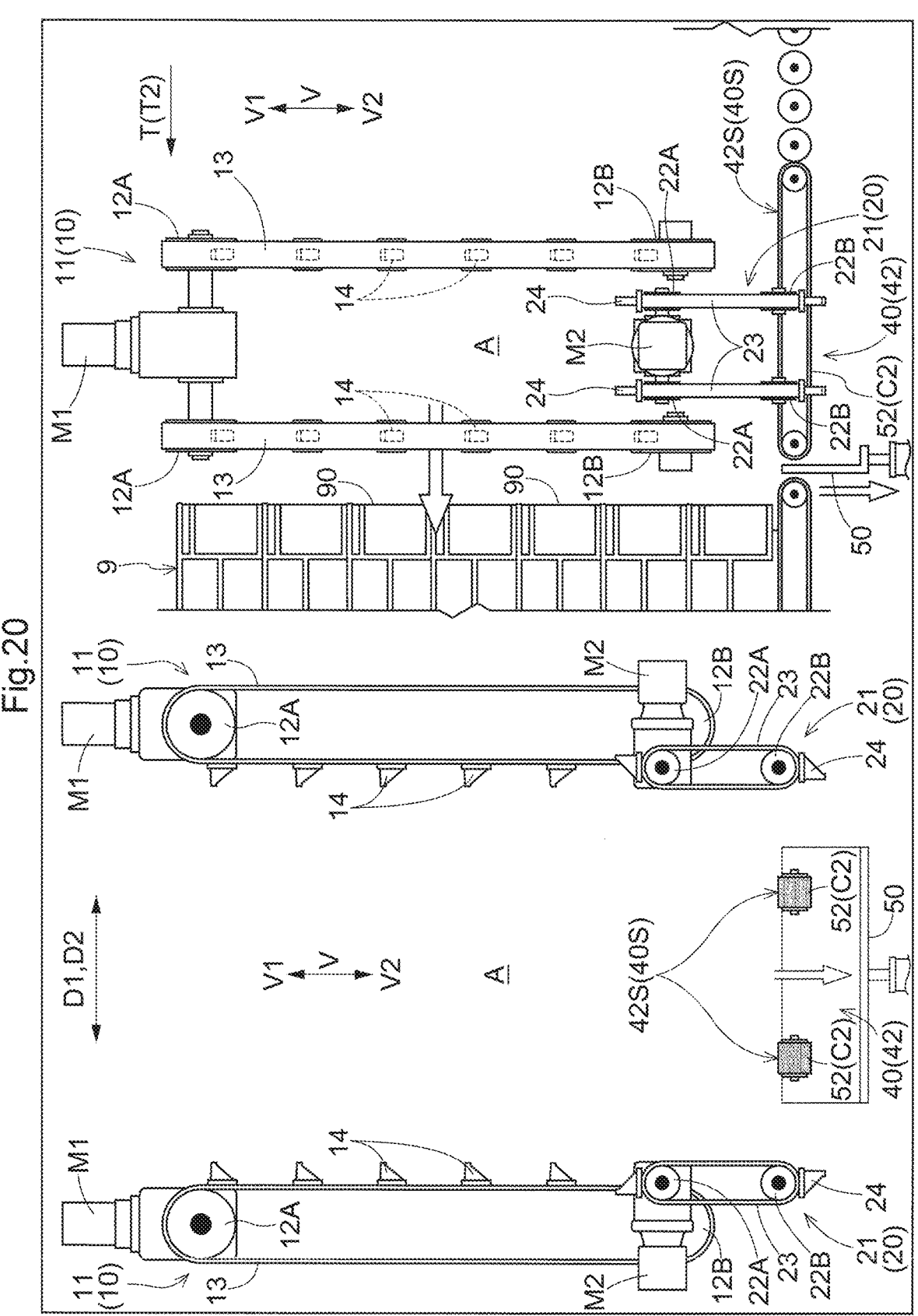
FIG. 20 is a diagram showing the stacking processing according to the embodiment.

As shown in FIG. 1, in the present embodiment, a stopper 50 configured to protrude and retract from the conveyance plane 42S of the second conveyor device 42 is disposed at a position corresponding to a downstream edge of the stacking target location Q in the second conveying direction T2 (an edge on the downstream side in the second conveying direction T2). As described above, in the present embodiment, the portion of the second conveyor device 42 including the stacking target location Q is constituted by the belt conveyor C2. Therefore, upper surfaces of the belts 52 of the belt conveyor C2 constitute the conveyance plane 42S of the second conveyor device 42 at the stacking target location Q (see FIG. 12). By making the stopper 50 protrude toward an upper side V1 from the conveyance plane 42S as shown in FIG. 12, it is possible to appropriately stop a container 90 conveyed by the second conveyor device 42 at the stacking target location Q (see FIG. 1). Also, by making the stopper 50 retract toward the lower side V2 so as not to protrude toward the upper side V1 from the conveyance plane 42S as shown in FIG. 20, it is possible to appropriately convey a stacked container group 9 from the stacking target location Q (see FIG. 1) by the second conveyor device 42.

In the present embodiment, the belt conveyor C2 constituting the portion of the second conveyor device 42 including the stacking target location Q is a double belt conveyor including a pair of belts 52. In the example shown in FIG. 1, the stopper 50 is disposed between the pair of belts 52 as viewed in the up-down direction. Note that a configuration is also possible in which, in the second conveying direction T2, the stopper 50 is adjacent to the downstream side of the belt conveyor C2 constituting the portion of the second conveyor device 42 including the stacking target location Q, as in the example shown in FIGS. 12 to 20.

Next, the following describes configurations of the unstacking device 1A and the stacking device 1B. In the present embodiment, the unstacking device 1A and the stacking device 1B have a common configuration. That is to say, in the present embodiment, a container processing apparatus 1 is used as the unstacking device 1A and another container processing apparatus 1 that has the same configuration as the aforementioned container processing apparatus 1 is used as the stacking device 1B. Hereinafter, the unstacking device 1A and the stacking device 1B will not be distinguished from each other and will be each referred to as "the container processing apparatus 1" in descriptions of the common configuration.

The container processing apparatus 1 executes at least one of: the stacking processing for generating a stacked container group 9 by sequentially stacking a plurality of containers 90; and the unstacking processing for sequentially separating containers 90 from a stacked container group 9 constituted by a plurality of containers 90 stacked on each other. In the present embodiment, each container processing apparatus 1 executes only one of the stacking processing and the unstacking processing. Specifically, the container processing apparatus 1 used as the unstacking device 1A executes only the unstacking processing, and the container processing apparatus 1 used as the stacking device 1B executes only the stacking processing.

Figure 2:
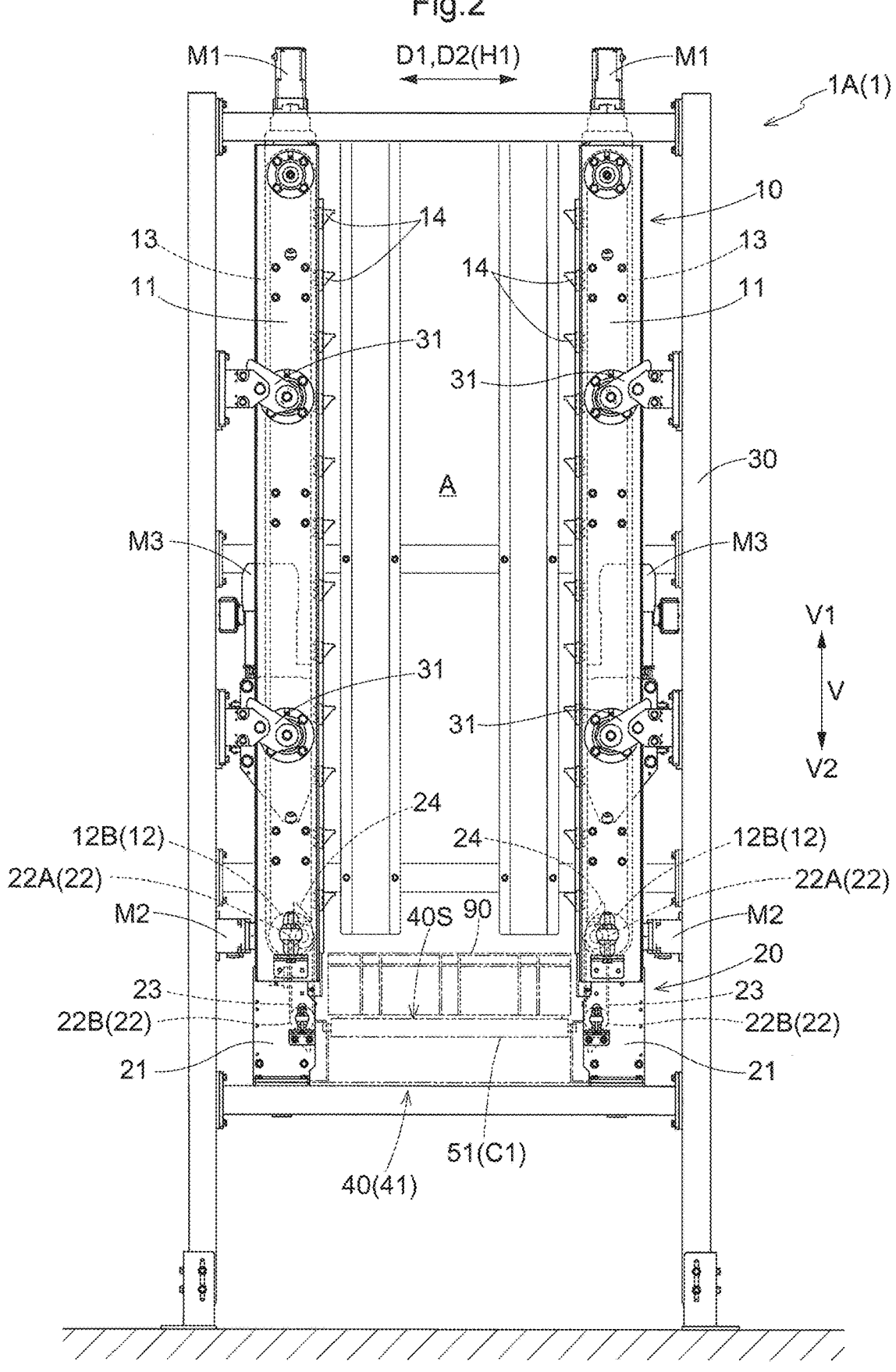
FIG. 2 is a front view of a container processing apparatus according to an embodiment.
Figure 3:
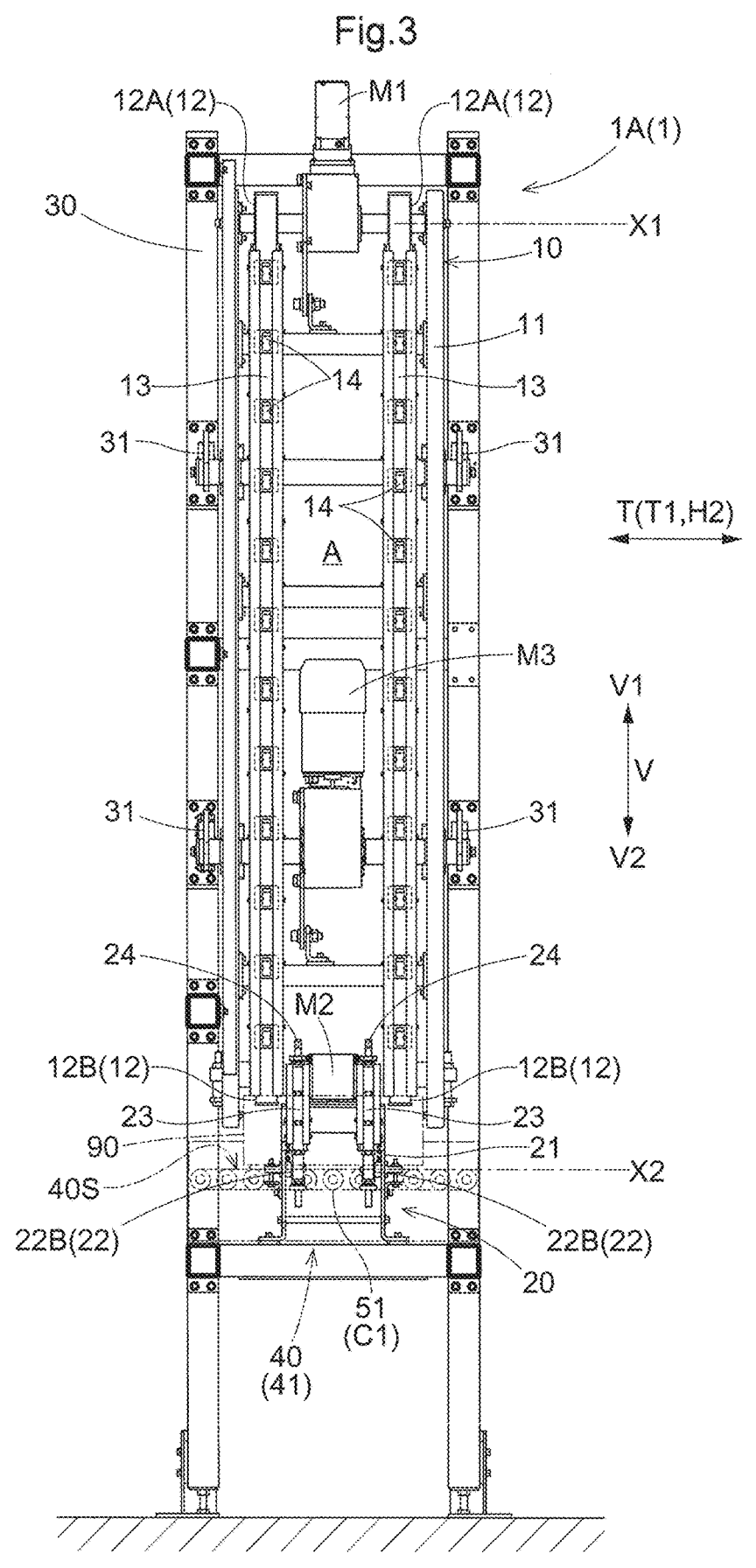
Figure 4:
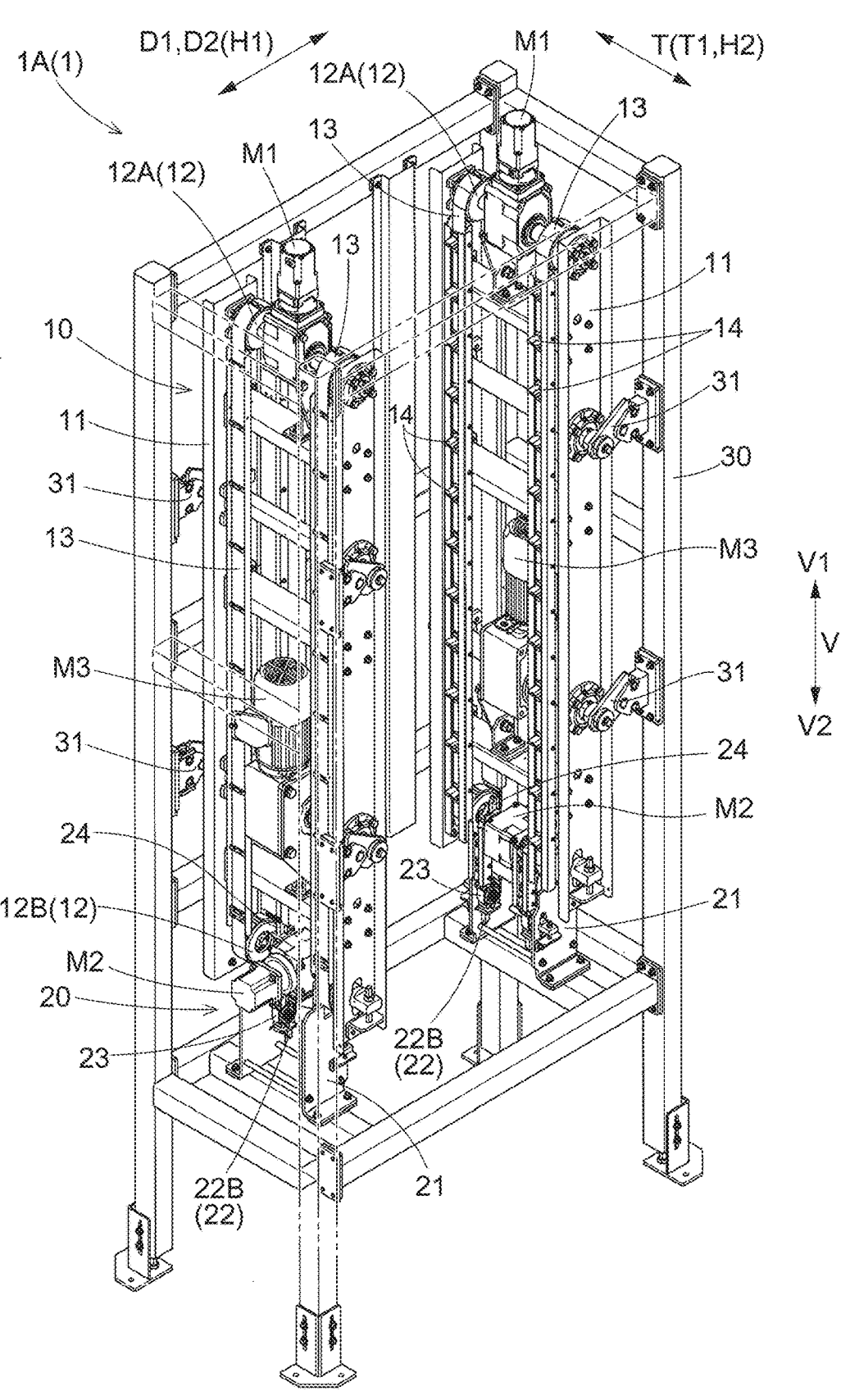
FIG. 4 is a partially transparent perspective view of the container processing apparatus according to the embodiment.

As shown in FIGS. 2 to 4, the container processing apparatus 1 includes a conveyor device 40, a first lifting device 10, and a second lifting device 20. The conveyor device 40 is omitted in FIG. 4. The container processing apparatus 1 further includes a support body 30 supporting the conveyor device 40, the first lifting device 10, and the second lifting device 20. In the example shown in FIGS. 2 to 4, the support body 30 is formed by coupling frame members.

The conveyor device 40 conveys a container 90 placed on a placement plane 40S in a conveying direction T that intersects the up-down direction V. A container group arrangement region A that is a region in which a stacked container group 9 is arranged is set above (on the upper side V1 of) the placement plane 40S. The conveying operation of the conveyor device 40 is controlled by a control unit (not shown) included in the container processing apparatus 1.

The container processing apparatus 1 shown in FIGS. 2 to 4 is used as the unstacking device 1A. Accordingly, the portion of the first conveyor device 41 including the unstacking target location P (see FIG. 1) constitutes the conveyor device 40 included in the unstacking device 1A. The conveying direction T in which the conveyor device 40 conveys a container 90 matches the first conveying direction T1. In the present embodiment, the roller conveyor C1 constituting the portion of the first conveyor device 41 including the unstacking target location P constitutes the conveyor device 40 included in the unstacking device 1A, and the conveyance plane of the roller conveyor C1 is the placement plane 40S of the conveyor device 40 (see FIGS. 5 and 6).

On the other hand, as shown in FIGS. 12 to 20, in the container processing apparatus 1 used as the stacking device 1B, the portion of the second conveyor device 42 including the stacking target location Q (see FIG. 1) constitutes the conveyor device 40 included in the stacking device 1B. The conveying direction T in which the conveyor device 40 conveys a container 90 matches the second conveying direction T2. In the present embodiment, the belt conveyor C2 constituting the portion of the second conveyor device 42 including the stacking target location Q constitutes the conveyor device 40 included in the stacking device 1B, and the conveyance plane 42S of the belt conveyor C2 is the placement plane 40S of the conveyor device 40.

The first lifting device 10 holds, lifts, and lowers a stacked container group 9. That is to say, the first lifting device 10 is capable of collectively holding, lifting, and lowering a plurality of containers 90 stacked on each other. The first lifting device 10 is positioned in such a manner as to hold, lift, and lower the containers 90 above (on the upper side V1 of) the placement plane 40S. As shown in FIGS. 2 to 4, the first lifting device 10 includes a pair of first locking units 11 facing each other and sandwiching the container group arrangement region A therebetween, and first drive units M1 (in the present embodiment, electric motors) that drive the pair of first locking units 11. Driving of the pair of first locking units 11 by the first drive units M1 is controlled by the control unit (not shown) included in the container processing apparatus 1.

As shown in FIGS. 2 and 4, in the present embodiment, the first drive units M1 are respectively provided for the first locking units 11, and the pair of first locking units 11 are driven by the pair of first drive units M1. Note that there is no difference between the pair of first drive units M1 in the manner of driving the first locking units 11, and the pair of first locking units 11 are driven by the pair of first drive units M1 in the same manner as in a case where a common first drive unit M1 that drives the pair of first locking units 11 is provided. Therefore, in the following description, the pair of first drive units M1 will be described as a single first drive unit M1.

The second lifting device 20 holds, lifts, and lowers the lowest container 90 of a stacked container group 9. That is to say, the second lifting device 20 is capable of holding, lifting, and lowering a single container 90 (specifically, the lowest container 90 of a stacked container group 9). The second lifting device 20 is positioned in such a manner as to hold, lift, and lower the container 90 above (on the upper side V1 of) the placement plane 40S. As shown in FIGS. 2 to 4, the second lifting device 20 includes a pair of second locking units 21 facing each other and sandwiching the container group arrangement region A therebetween, and second drive units M2 (in the present embodiment, electric motors) that drive the pair of second locking units 21. Driving of the pair of second locking units 21 by the second drive units M2 is controlled by the control unit (not shown) included in the container processing apparatus 1.

As shown in FIGS. 2 and 4, in the present embodiment, the second drive units M2 are respectively provided for the second locking units 21, and the pair of second locking units 21 are driven by the pair of second drive units M2. Note that there is no difference between the pair of second drive units M2 in the manner of driving the second locking units 21, and the pair of second locking units 21 are driven by the pair of second drive units M2 in the same manner as in a case where a common second drive unit M2 that drives the pair of second locking units 21 is provided. Therefore, in the following description, the pair of second drive units M2 will be described as a single second drive unit M2.

Here, as shown in FIGS. 2 and 4, the direction in which the pair of first locking units 11 face each other will be referred to as a "first facing direction D1", and the direction in which the pair of second locking units 21 face each other will be referred to as a "second facing direction D2". In the present embodiment, the first facing direction D1 and the second facing direction D2 are parallel (parallel or substantially parallel) to each other. Also, in the present embodiment, the conveying direction T is orthogonal to the first facing direction D1 as viewed in the up-down direction (see FIG. 4). As shown in FIGS. 1 and 4, the container processing apparatus 1 is installed in such a manner that the first facing direction D1 and the second facing direction D2 extend along the first horizontal direction H1 and the conveying direction T extends along the second horizontal direction H2.

As shown in FIGS. 2 to 4, in the present embodiment, the first lifting device 10 further includes third drive units M3 (in the present embodiment, electric motors) that move the pair of first locking units 11 toward each other and away from each other in the first facing direction D1. Operations of the third drive units M3 for moving the pair of first locking units 11 toward each other and away from each other are controlled by the control unit (not shown) included in the container processing apparatus 1.

As shown in FIGS. 2 and 4, in the present embodiment, the third drive units M3 are respectively provided for the first locking units 11, and both of the first locking units 11 are moved by the pair of third drive units M3 in the first facing direction D1 toward each other and away from each other. Note that there is no difference between the pair of third drive units M3 in the manner of moving the first locking units 11 in the first facing direction D1, and the pair of first locking units 11 are driven by the pair of third drive units M3 in the same manner as in a case where a common third drive unit M3 that moves the pair of first locking units 11 toward each other and away from each other is provided. Therefore, in the following description, the pair of third drive units M3 will be described as a single third drive unit M3.

In the present embodiment, the third drive unit M3 is configured to move the pair of first locking units 11 toward the upper side V1 while moving the pair of first locking units 11 toward each other in the first facing direction D1. Specifically, as shown in FIGS. 2 to 4, each of the first locking units 11 is coupled to the support body 30 via a coupling mechanism 31 (here, a link mechanism), and the third drive unit M3 moves the pair of first locking units 11 via the coupling mechanisms 31 toward each other and away from each other in the first facing direction D1. The coupling mechanisms 31 couple the pair of first locking units 11 to the support body 30 in such a manner that the pair of first locking units 11 move toward the upper side V1 as the pair of first locking units 11 move toward each other in the first facing direction D1, and the pair of first locking units 11 move toward the lower side V2 as the pair of first locking units 11 move away from each other in the first facing direction D1.

As shown in FIGS. 2 to 4, each of the first locking units 11 includes a first endless member 13 wound around a pair of first rotary members 12 that are spaced apart from each other in the up-down direction V and a plurality of first locking portions 14 fixed to an outer circumferential portion of the first endless member 13 at a constant interval along the extending direction of the first endless member 13. For example, timing pulleys can be used as the first rotary members 12 and a toothed belt can be used as the first endless member 13. As shown in FIGS. 3 and 4, in the present embodiment, each of the first locking units 11 includes two first rotary units each including the pair of first rotary members 12 and the first endless member 13 wound around the first rotary members 12. These two first rotary units are configured in such a manner that the respective first endless members 13 rotate (circulate) synchronously with each other. In the present embodiment, these two first rotary units are spaced apart from each other in the conveying direction T.

The first drive unit M1 is configured to drive a pair of first endless members 13 included in the pair of first locking units 11 in such a manner that the first endless members 13 rotate (circulate) synchronously with each other. That is to say, the first drive unit M1 drives the first endless member 13 (in the present embodiment, the first endless members 13 of the two first rotary units) included in one of the first locking units 11 and the first endless member 13 (in the present embodiment, the first endless members 13 of the two first rotary units)

included in the other first locking unit 11 in such a manner that the first endless members 13 rotate synchronously with each other.

Here, out of the pair of first rotary members 12 spaced apart from each other in the up-down direction V, the first rotary member 12 located on the upper side V1 will be referred to as an "upper first rotary member 12A", and the first rotary member 12 located on the lower side V2 will be referred to as a "lower first rotary member 12B". In the present embodiment, the first drive unit M1 is configured to rotate the upper first rotary member 12A. That is to say, in the present embodiment, the upper first rotary member 12A is a driving rotary member, and the lower first rotary member 12B is a driven rotary member.

Figure 9:
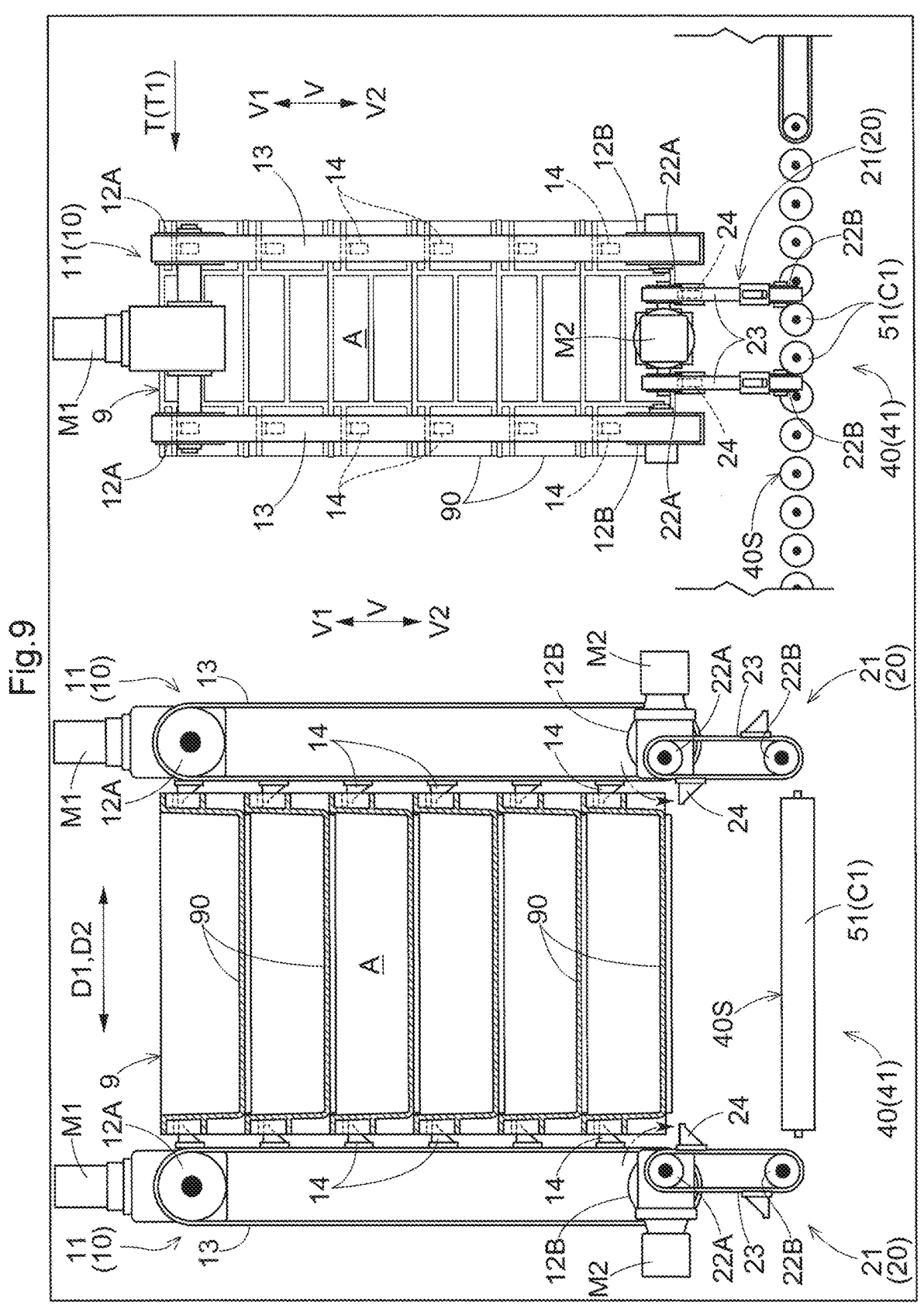
FIG. 9 is a diagram showing the unstacking processing according to the embodiment.

As shown in FIG. 9, for example, each first locking unit 11 of the pair of first locking units 11 is positioned in such a manner that the plurality of first locking portions 14 are respectively locked to side surfaces S (see FIGS. 5 and 6) of a plurality of containers 90 included in a stacked container group 9 arranged in the container group arrangement region A, in a state where the first locking portions 14 are lined up along the up-down direction V and face the container group arrangement region A. This configuration enables the first lifting device 10 to collectively hold, lift, and lower the plurality of containers 90 included in the stacked container group 9. Note that the containers 90 are held from both sides in the first facing direction D1 by the first locking portions 14 fixed to the first endless members 13 included in one of the first locking units 11 and the first locking portions 14 fixed to the first endless members 13 included in the other first locking unit 11. As described later with reference to FIGS. 9 and 10, the first locking units 11 are configured in such a manner that, when the first locking portions 14 move downward (move downward in the container group arrangement region A) as the first endless members 13 rotate, the first locking units 11 (the first locking portions 14) are unlocked from the side surfaces S of the lowest container 90 before the lowest container 90 is placed on the placement plane 40S.

As shown in FIGS. 2 to 4, each of the second locking units 21 includes a second endless member 23 wound around a pair of second rotary members 22 that are spaced apart from each other in the up-down direction V and second locking portions 24 fixed to an outer circumferential portion of the second endless member 23. Although a configuration is also possible in which only one second locking portion 24 is fixed to the outer circumferential portion of the second endless member 23, in the present embodiment, a plurality of (specifically, two) second locking portions 24 are fixed to the outer circumferential portion of the second endless member 23 at a constant interval along the extending direction of the second endless member 23. For example, timing pulleys can be used as the second rotary members 22 and a toothed belt can be used as the second endless member 23. As shown in FIGS. 3 and 4, in the present embodiment, each of the second locking units 21 includes two second rotary units each including the pair of second rotary members 22 and the second endless member 23 wound around the second rotary members 22. These two second rotary units are configured in such a manner that the respective second endless members 23 rotate (circulate) synchronously with each other. In the present embodiment, these two second rotary units are spaced apart from each other in the conveying direction T.

The second drive unit M2 is configured to drive a pair of second endless members 23 included in the pair of second locking units 21 in such a manner that the second endless members 23 rotate (circulate) synchronously with each other. That is to say, the second drive unit M2 drives the second endless member 23 (in the present embodiment, the second endless members 23 of the two second rotary units) included in one of the second locking units 21 and the second endless member 23 (in the present embodiment, the second endless members 23 of the two second rotary units) included in the other second locking unit 21 in such a manner that the second endless members 23 rotate synchronously with each other.

Here, out of the pair of second rotary members 22 spaced apart from each other in the up-down direction V, the second rotary member 22 located on the upper side V1 will be referred to as an "upper second rotary member 22A", and the second rotary member 22 located on the lower side V2 will be referred to as a "lower second rotary member 22B". In the present embodiment, the second drive unit M2 is configured to rotate the upper second rotary member 22A. That is to say, in the present embodiment, the upper second rotary member 22A is a driving rotary member, and the lower second rotary member 22B is a driven rotary member.

As shown in FIGS. 2 and 3, in the present embodiment, the lower second rotary member 22B is located on the lower side V2 relative to the lower first rotary member 12B. Here, "the lower second rotary member 22B is located on the lower side V2 relative to the lower first rotary member 12B" means that at least the lowest portion of the lower second rotary member 22B is located on the lower side V2 relative to the lowest portion of the lower first rotary member 12B. In the present embodiment, the entire lower second rotary member 22B is located on the lower side V2 relative to the lowest portion of the lower first rotary member 12B.

Figure 16:
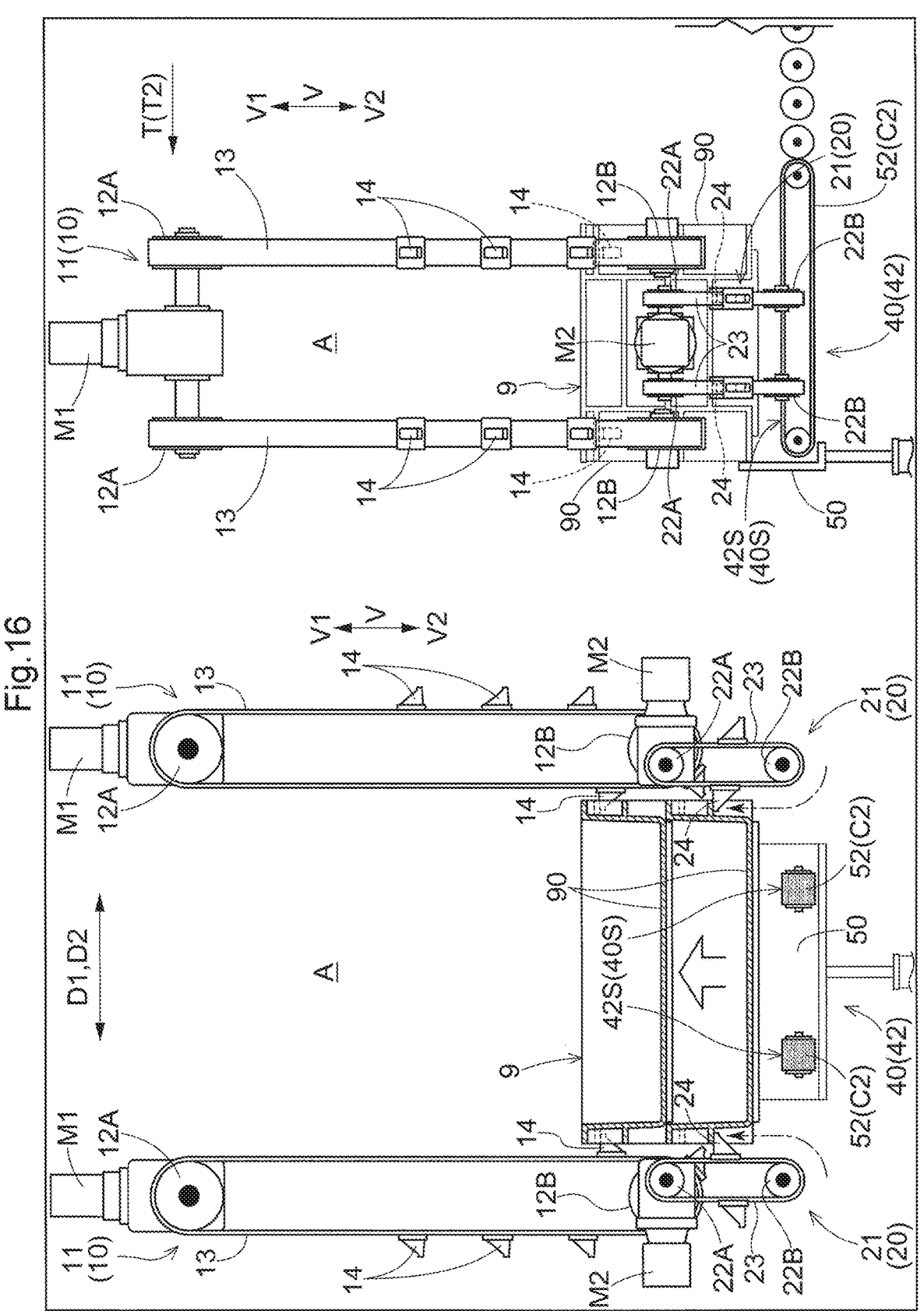
FIG. 16 is a diagram showing the stacking processing according to the embodiment.

As shown in FIG. 16, for example, each second locking unit 21 of the pair of second locking units 21 is positioned in such a manner that the second locking portions 24 are locked to a side surface S (see FIGS. 5 and 6) of the lowest container 90 of a stacked container group 9 arranged in the container group arrangement region A, in a state where the second locking portions 24 face the container group arrangement region A. This configuration enables the second lifting device 20 to hold, lift, and lower only the lowest container 90 of the stacked container group 9. Note that the container 90 is held from both sides in the second facing direction D2 by the second locking portions 24 fixed to the second endless members 23 included in one of the second locking units 21 and the second locking portions 24 fixed to the second endless members 23 included in the other second locking unit 21. As described later with reference to FIGS. 9 and 10, the second locking units 21 are configured in such a manner that, when the second locking portions 24 move downward (move downward in the container group arrangement region A) as the second endless members 23 rotate, the second locking units 21 (the second locking portions 24) are unlocked from the side surfaces S of the lowest container 90 at the same time as the lowest container 90 is placed on the placement plane 40S. Note that the second locking portions 24 do not necessarily need to be unlocked "at the same time" in the strict sense of the word as the lowest container 90 is placed on the placement plane 40S, and there may be a certain period between these two events (e.g., a period that is short enough to consider that the two events occur at the same time).

As described above, in the container processing apparatus 1, it is possible to collectively hold, lift, and lower a plurality of containers 90 included in a stacked container group 9 with use of the first lifting device 10, and hold, lift, and lower only the lowest container 90 of the stacked container group 9 with use of the second lifting device 20. In the container processing apparatus 1, the first drive unit M1 and the second drive unit M2 are configured to operate independently of each other. Therefore, the pair of first locking units 11 of the first lifting device 10 and the pair of second locking units 21 of the second lifting device 20 can be caused to operate independently of each other. This configuration makes it possible to smoothly transfer the lowest container 90 between the stacked container group 9 and the conveyor device 40 with use of the second lifting device 20 in the unstacking processing and the stacking processing, which will be described later.

Figure 5:
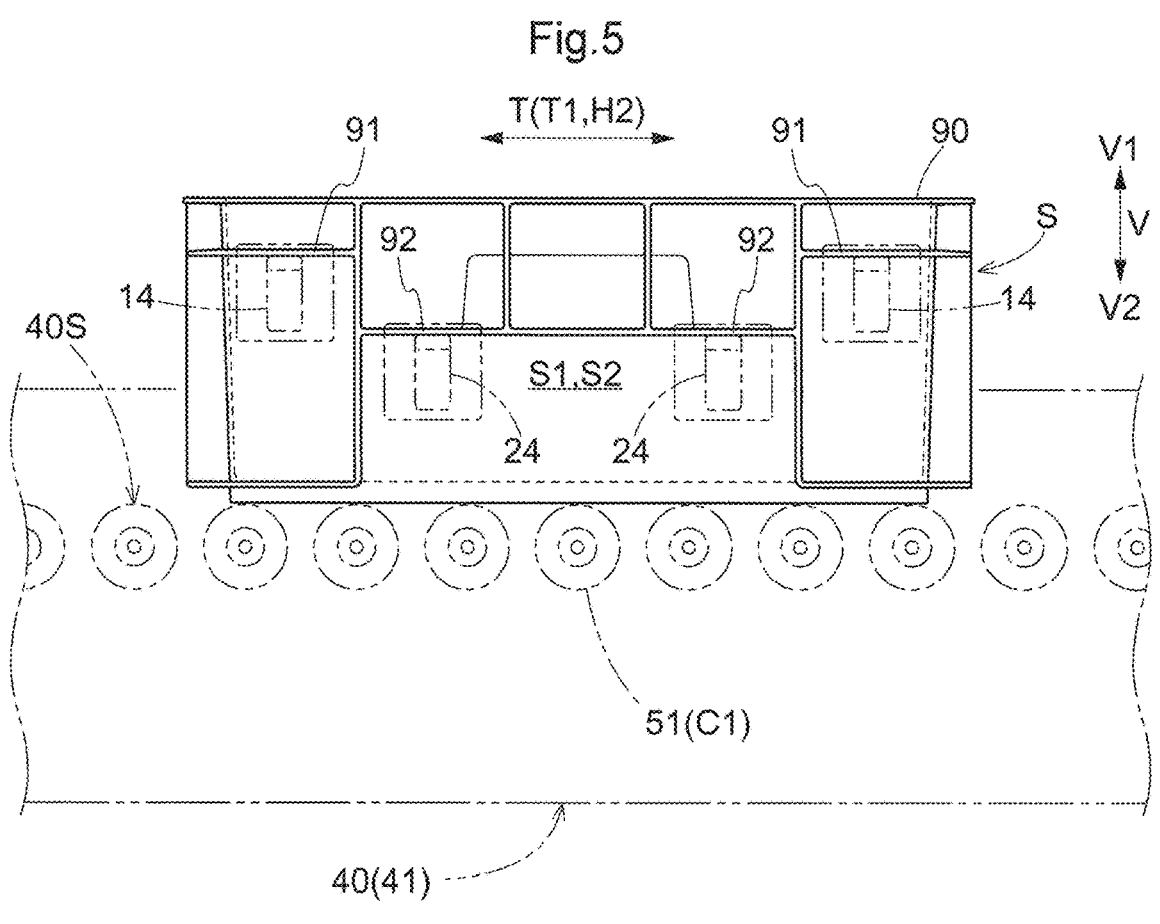
FIG. 5 is a side view of a container according to an embodiment.

As shown in FIGS. 5 and 6, the side surfaces S of each container 90 include first lock target portions 91 to which the first locking portions 14 are locked and second lock target portions 92 to which the second locking portions 24 are locked. In the present embodiment, protrusions (ribs) protruding outward from the side surfaces S are formed on the side surfaces S of each container 90 in such a manner as to extend in a horizontal direction H, and the protrusions constitute the first lock target portions 91 and the second lock target portions 92. In other words, the protrusions formed on the side surfaces S of each container 90 are used as the first lock target portions 91 and the second lock target portions 92. The first locking portions 14 are locked to lower surfaces of the first lock target portions 91 as shown in FIG. 5 in which the positions of the first locking portions 14 locked to the first lock target portions 91 are shown with dash-dot-dot lines. Likewise, the second locking portions 24 are locked to lower surfaces of the second lock target portions 92 as shown in FIG. 5 in which the positions of the second locking portions 24 locked to the second lock target portions 92 are shown with dash-dot-dot lines.

As shown in FIG. 5, in the present embodiment, a first locking portion 14 fixed to the first endless member 13 of one of the two first rotary units included in each first locking unit 11 and a first locking portion 14 fixed to the first endless member 13 of the other first rotary unit are locked to a side surface S of a container 90 at different positions in the horizontal direction H (here, the second horizontal direction H2). Likewise, in the present embodiment, a second locking portion 24 fixed to the second endless member 23 of one of the two second rotary units included in each second locking unit 21 and a second locking portion 24 fixed to the second endless member 23 of the other second rotary unit are locked to a side surface S of the container 90 at different positions in the horizontal direction H (here, the second horizontal direction H2).

Here, the side surface S of the container 90 to which the first locking portions 14 are locked will be referred to as a "first target side surface S1", and the side surface S of the container 90 to which the second locking portions 24 are locked will be referred to as a "second target side surface S2". Out of the four side surfaces S of each container 90, two side surfaces S respectively facing opposite sides in the first facing direction D1 are the first target side surfaces S1. Also, out of the four side surfaces S of each container 90, two side surfaces S respectively facing opposite sides in the second facing direction D2 are the second target side surfaces S2. In the present embodiment, the first facing direction D1 and the second facing direction D2 are parallel to each other. Accordingly, the first target side surfaces S1 and the second target side surfaces S2 are common side surfaces S as shown in FIG. 6. As shown in FIG. 5, in the present embodiment, each surface S that is the first target side surface S1 as well as the second target side surface S2 has two second lock target portions 92 between two first lock target portions 91 in the horizontal direction H (here, the second horizontal direction H2). As described above, in the present embodiment, the second lock target portions 92 are located at positions that are different from the positions of the first lock target portions 91 in the horizontal direction H (here, the second horizontal direction H2). Also, in the present embodiment, the second lock target portions 92 are located on the lower side V2 relative to the first lock target portions 91.

As shown in FIG. 3, in the present embodiment, a first rotation axis X1 that is the rotation axis of the first rotary members 12 extends along the second horizontal direction H2. Also, in the present embodiment, a second rotation axis X2 that is the rotation axis of the second rotary members 22 extends along the second horizontal direction H2. As shown in FIG. 5, in the present embodiment, the first target side surfaces S1 and the second target side surfaces S2 are orthogonal to the first horizontal direction H1. Accordingly, in the present embodiment, rotation axes (first rotation axes X1) of the pair of first rotary members 12 extend along the horizontal direction H and a direction parallel to the first target side surfaces S1. Therefore, it is possible to lock the first locking portions 14 to the first lock target portions 91 and release the first locking portions 14 therefrom by rotating the first endless members 13. Also, in the present embodiment, rotation axes (second rotation axes X2) of the pair of second rotary members 22 extend along the horizontal direction H and a direction parallel to the second target side surfaces S2. Therefore, it is possible to lock the second locking portions 24 to the second lock target portions 92 and release the second locking portions 24 therefrom by rotating the second endless members 23.

Next, the following describes the unstacking processing executed by the container processing apparatus 1 (the unstacking device 1A) with reference to FIGS. 7 to 11. The control unit included in the unstacking device 1A controls driving of the first drive unit M1, the second drive unit M2, the third drive unit M3, etc., to perform operations described below, and thus the unstacking processing is executed. Note that FIGS. 7 to 11 show scenes in the unstacking processing in chronological order, and the larger the figure number of a drawing is, the later the scene shown in the drawing is. In FIGS. 7 to 11, a front view and a side view of the container processing apparatus 1 (the unstacking device 1A) are shown side by side to facilitate understanding.

Figure 7:
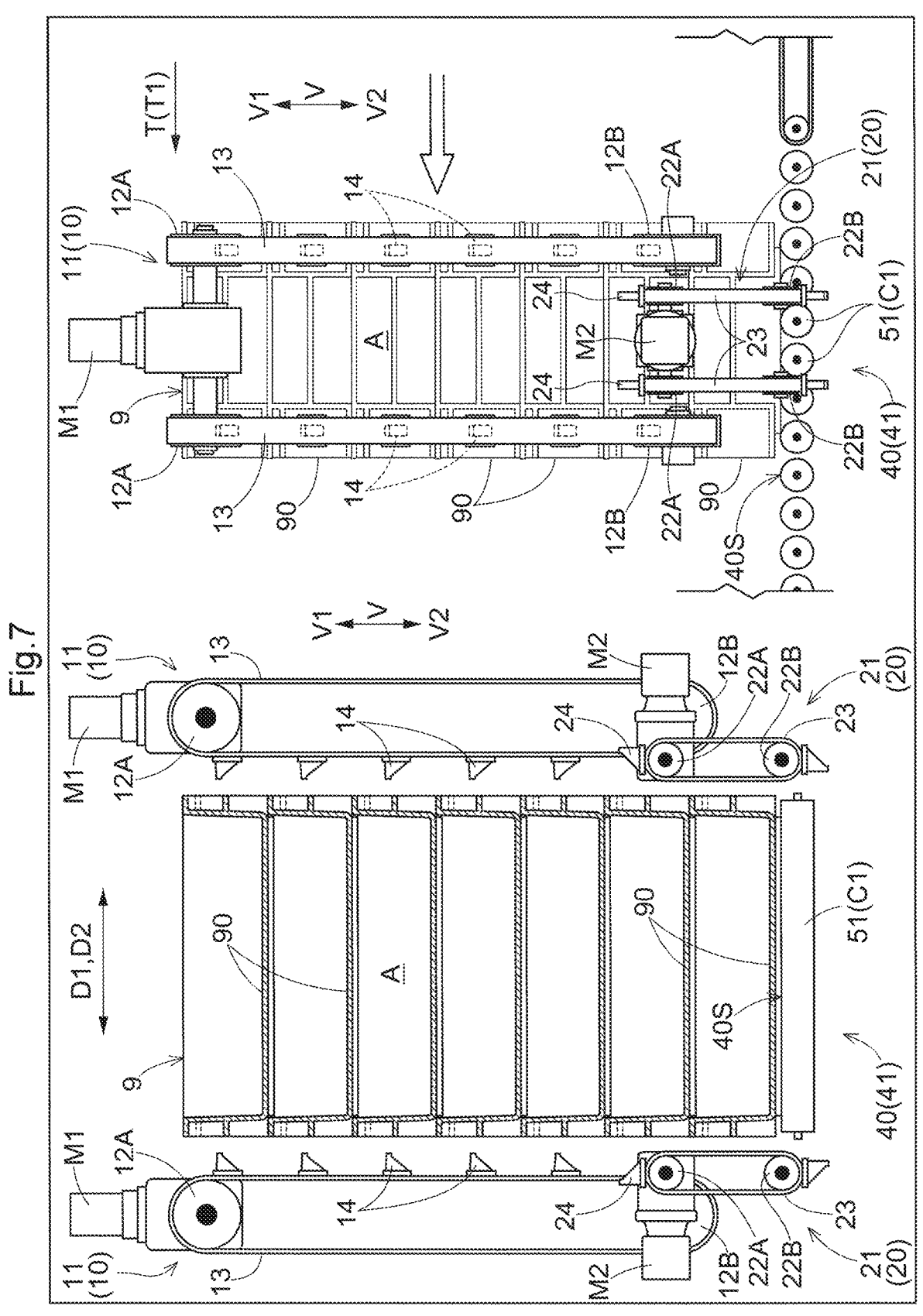
FIG. 7 is a diagram showing unstacking processing according to an embodiment.

As shown in FIG. 7, a stacked container group 9 that is to be subjected to the unstacking processing is conveyed to the unstacking target location P (see FIG. 1) through a conveying operation of the conveyor device 40 (the first conveyor device 41). The stacked container group 9 conveyed to the unstacking target location P is arranged in the container group arrangement region A. In the present embodiment, when the stacked container group 9 is conveyed to the unstacking target location P, the distance between the pair of first locking units 11 in the first facing direction D1 is increased to such an extent that the first locking portions 14 fixed to the first endless members 13 do not interfere with the stacked container group 9 to avoid interference between the first locking units 11 and the stacked container group 9. Also, in the present embodiment, when the stacked container group 9 is conveyed to the unstacking target location P, rotation positions of the second endless members 23 are adjusted to positions at which the second locking portions 24 do not interfere with the stacked container group 9 to avoid interference between the second locking units 21 and the stacked container group 9.

Figure 8:
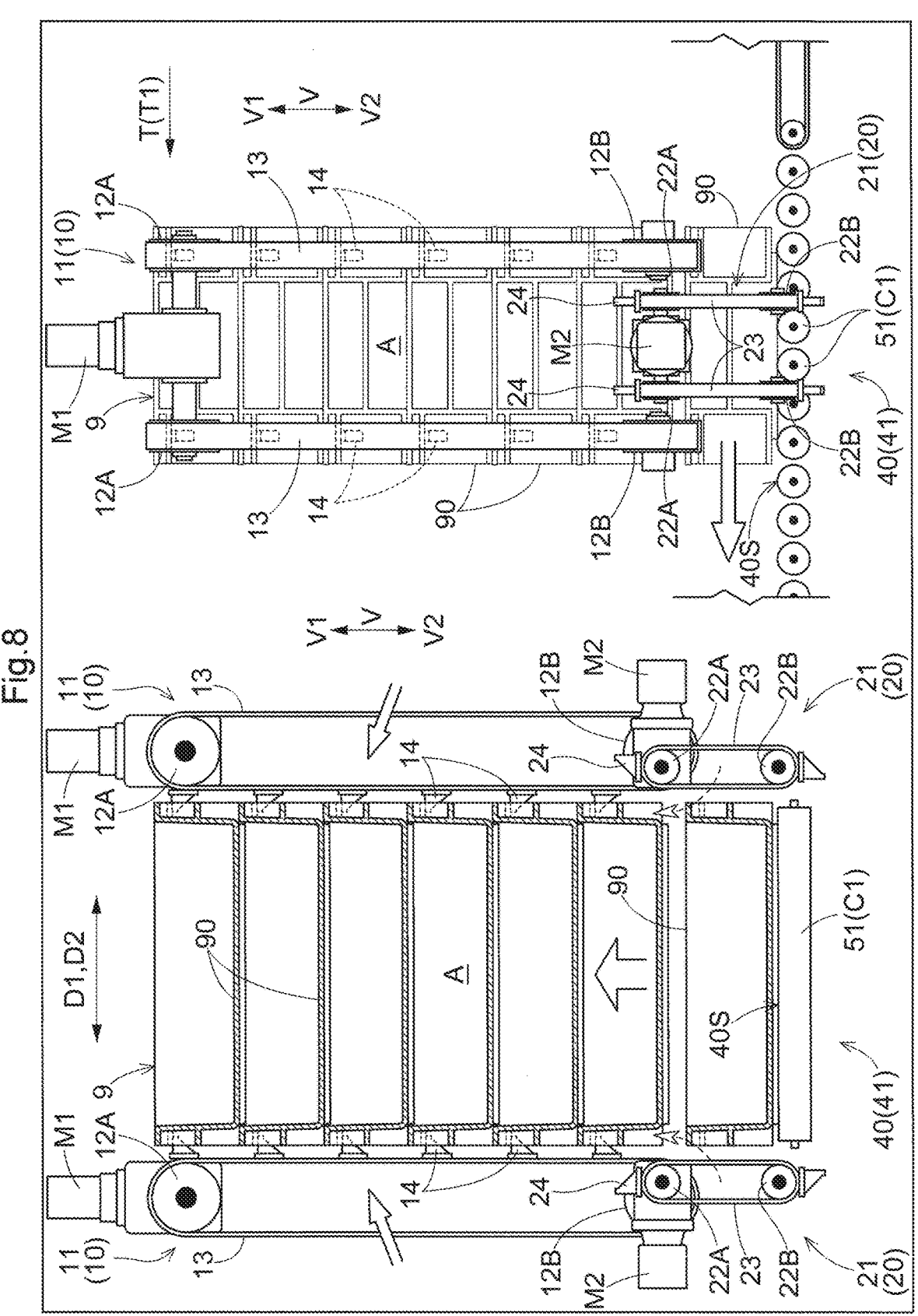
FIG. 8 is a diagram showing the unstacking processing according to the embodiment.

Note that the second lifting device 20 may also include a fourth drive unit (e.g., an electric motor) that moves the pair of second locking units 21 toward each other and away from each other in the second facing direction D2. In this case, it is also possible to avoid interference between the second locking units 21 and the stacked container group 9 by increasing the distance between the pair of second locking units 21 in the second facing direction D2 to such an extent that the second locking portions 24 fixed to the second endless members 23 do not interfere with the stacked container group 9. As shown in FIG. 8, in the state where the stacked container group 9 is arranged in the container group arrangement region A, the pair of first locking units 11 are driven to hold all containers 90 other than the lowest container 90 (in the example shown in FIG. 8, the second through seventh containers 90 as counted from the bottom) with use of the first lifting device 10. In the present embodiment, all the containers 90 other than the lowest container 90 are held by the first lifting device 10 by reducing the distance between the pair of first locking units 11 in the first facing direction D1 until the first locking portions 14 fixed to the first endless members 13 overlap the first lock target portions 91 (see FIG. 6) as viewed in the up-down direction, and then rotating the pair of first endless members 13 included in the pair of first locking units 11 in such a direction that the first locking portions 14 move upward in the container group arrangement region A. The plurality of first locking portions 14 are fixed to the outer circumferential portion of each first endless member 13 at a constant interval along the extending direction of the first endless member 13, and the interval corresponds to an interval in the up-down direction V between respective first lock target portions 91 of two containers 90 that are adjacent to each other in the up-down direction V in the stacked container group. Therefore, the first locking portions 14 are locked to the respective side surfaces S of the containers 90 other than the lowest container 90 as shown in FIG. 8.

As shown in FIG. 8, the pair of first endless members 13 included in the pair of first locking units 11 are rotated until the second container 90 as counted from the bottom is lifted to a height (hereinafter referred to as a "conveyance allowing height") at which the second container 90 as counted from the bottom is removed from the lowest container 90 to allow the lowest container 90 to be conveyed in the conveying direction T (the first conveying direction T1). In this state, the lowest container 90 is conveyed in the conveying direction T (see the right drawing in FIG. 8).

Note that, in the present embodiment, the pair of first locking units 11 move toward the upper side V1 as a result of the distance between the pair of first locking units 11 in the first facing direction D1 being reduced, but the first locking portions 14 are not locked to the first lock target portions 91 of the containers 90 even when the distance between the pair of first locking units 11 in the first facing direction D1 is reduced. Unlike this configuration, a configuration is also possible in which the first locking portions 14 are locked to the first lock target portions 91 of the containers 90 as a result of the distance between the pair of first locking units 11 in the first facing direction D1 being reduced. In this case, if the second container 90 as counted from the bottom is lifted to the conveyance allowing height described above as a result of the distance between the pair of first locking units 11 in the first facing direction D1 being reduced, it is possible to thereafter convey the lowest container 90 without rotating the pair of first endless members 13 included in the pair of first locking units 11.

After the lowest container 90 is conveyed, the pair of second endless members 23 included in the pair of second locking units 21 are rotated to arrange the second locking portions 24 at positions at which the second locking portions 24 can be locked to the second lock target portions 92 (see FIG. 6) of the new lowest container 90 (the second container 90 as counted from the bottom when conveyed to the unstacking target location P) as shown in FIG. 9. Also, the pair of first endless members 13 included in the pair of first locking units 11 are rotated in such a direction that the first locking portions 14 move downward in the container group arrangement region A to lower the new lowest container 90 (hereinafter simply referred to as "the lowest container 90") to a height at which the second locking portions 24 are locked to the second lock target portions 92 of the container 90 (the height of the container 90 shown in FIG. 14). As a result, the second locking portions 24 are locked to the second lock target portions 92 of the lowest container 90 in which the first locking portions 14 are locked to the first lock target portions 91.

Figure 10:
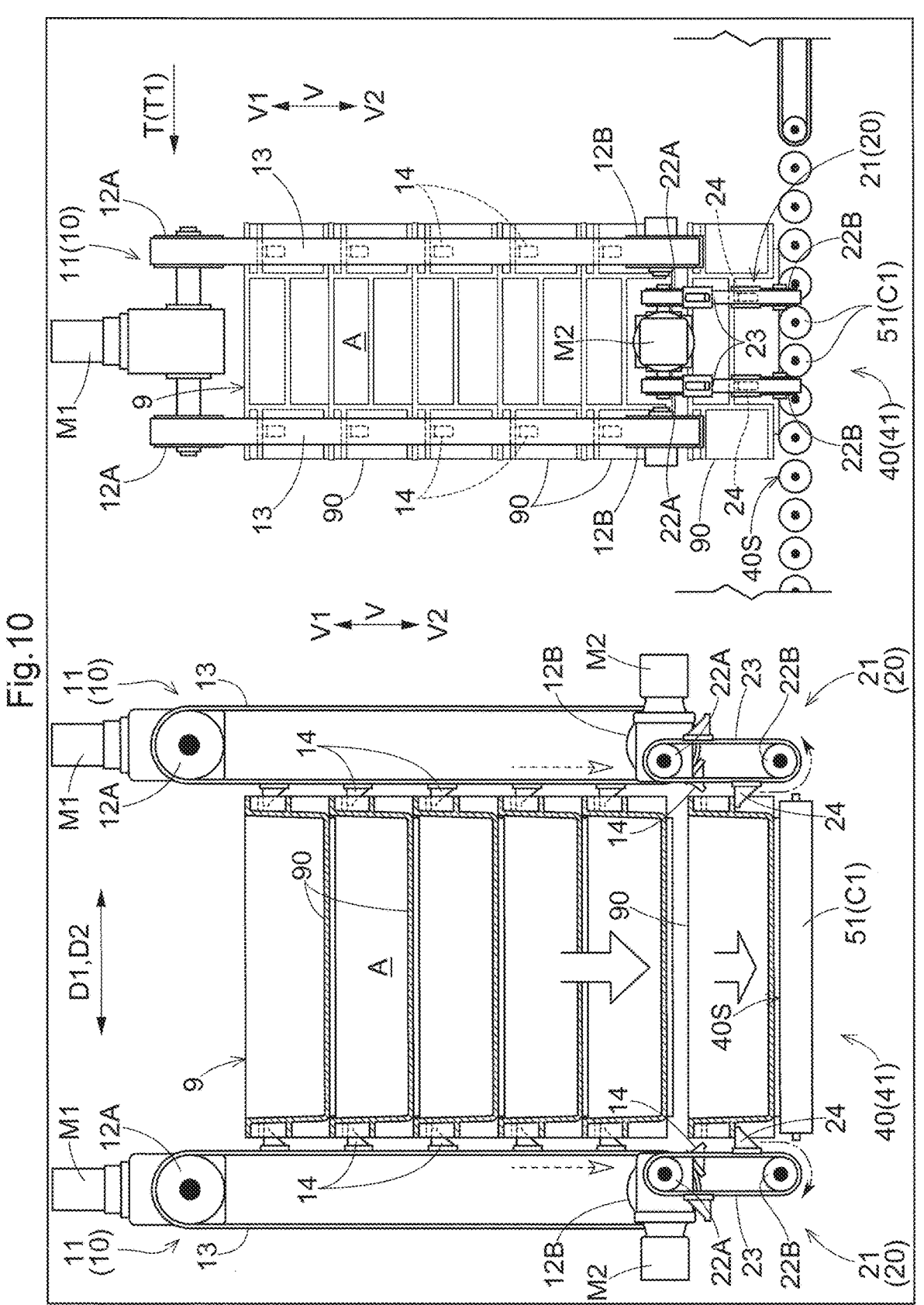
FIG. 10 is a diagram showing the unstacking processing according to the embodiment.

Thereafter, the pair of first endless members 13 included in the pair of first locking units 11 are rotated in such a direction that the first locking portions 14 move downward in the container group arrangement region A, and the pair of second endless members 23 included in the pair of second locking units 21 are rotated in such a direction that the second locking portions 24 move downward in the container group arrangement region A, and consequently, the first locking portions 14 are unlocked from the first lock target portions 91 of the lowest container 90, and the lowest container 90 can be lowered to the placement plane 40S while being held by the second lifting device 20 as shown in FIG. 10. The lower second rotary members 22B are located on the lower side V2 relative to the lower first rotary members 12B, and therefore, the second lifting device 20 can lift and lower the container 90 in a region that is on the lower side V2 in the up-down direction V relative to a lowest position at which the first lifting device 10 can hold the container 90. Therefore, even after the first locking portions 14 are unlocked from the first lock target portions 91, it is possible to lower the lowest container 90 while holding the container 90 with use of the second lifting device 20. In the present embodiment, the second locking portions 24 are kept locked to the second lock target portions 92 until the lowest container 90 is placed onto the placement plane 40S, and the second locking portions 24 are unlocked from the second lock target portions 92 when the weight of the lowest container 90 is supported by the placement plane 40S.

As described above, the first locking units 11 are configured in such a manner that, when the first locking portions 14 move downward as the first endless members 13 rotate, the first locking units 11 (the first locking portions 14) are unlocked from the side surfaces S of the lowest container 90 before the lowest container 90 is placed on the placement plane 40S. Also, the second locking units 21 are configured in such a manner that, when the second locking portions 24 move downward as the second endless members 23 rotate, the second locking units 21 (the second locking portions 24) are unlocked from the side surfaces S of the lowest container 90 at the same time as the lowest container 90 is placed on the placement plane 40S. As described above, the first locking portions 14 are unlocked from the side surfaces S of the lowest container 90 before the lowest container 90 is placed on the placement plane 40S, and accordingly, it is possible to separate the lowest container 90 from the group of other containers 90 held by the first lifting device 10 toward the lower side V2 and lower the lowest container 90 onto the placement plane 40S.

Figure 11:
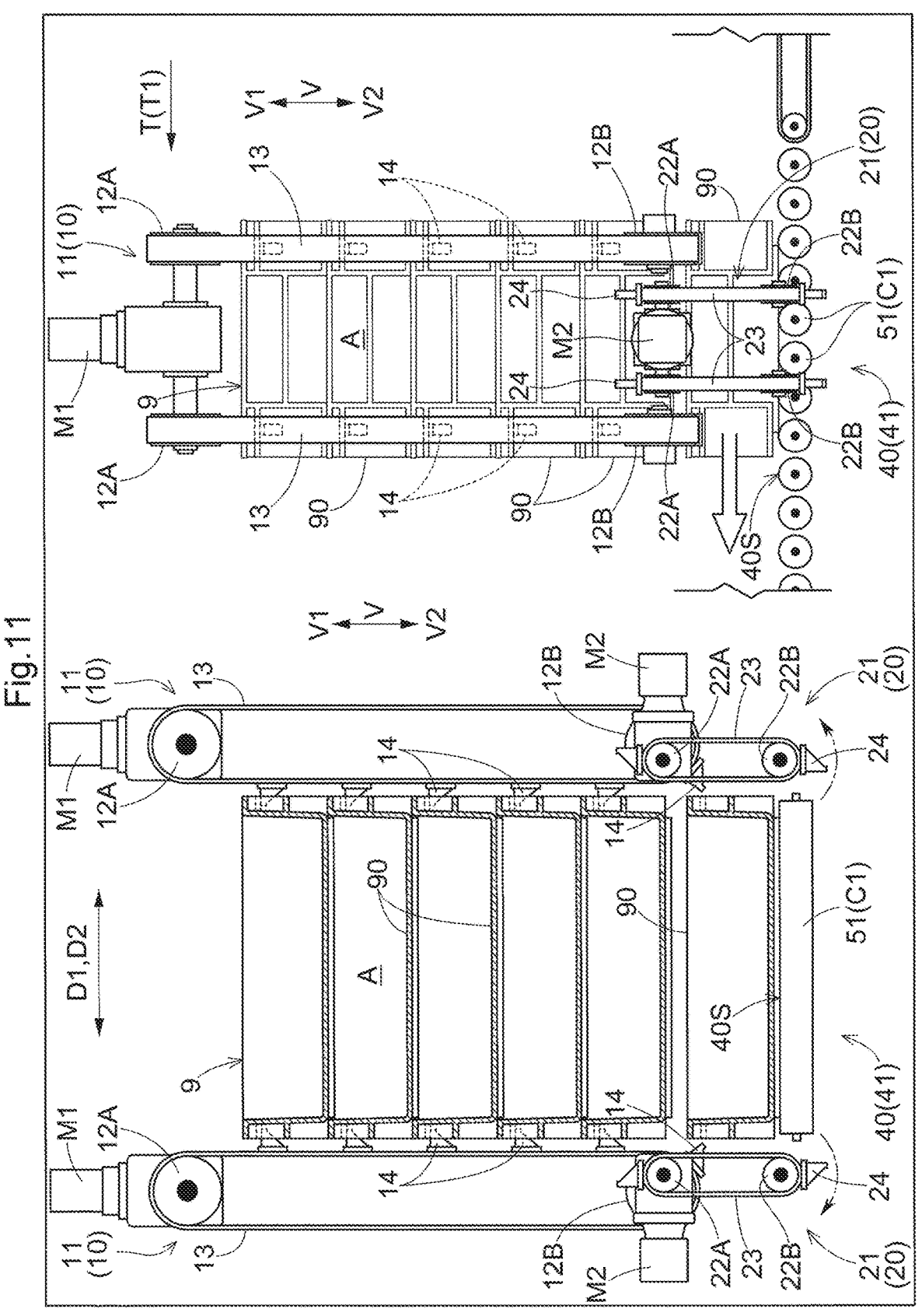
FIG. 11 is a diagram showing the unstacking processing according to the embodiment.

After the lowest container 90 is placed on the placement plane 40S, the pair of second endless members 23 included in the pair of second locking units 21 are rotated until the second locking portions 24 come to positions at which the second locking portions 24 do not interfere with the lowest container 90 as shown in FIG. 11, and accordingly, the lowest container 90 can be conveyed (see the right drawing in FIG. 11). By repeatedly performing the operations shown in FIGS. 9 to 11, it is possible to sequentially separate and convey the lowest container 90.

Next, the following describes the stacking processing executed by the container processing apparatus 1 (the stacking device 1B) with reference to FIGS. 12 to 20. The control unit included in the stacking device 1B controls driving of the first drive unit M1, the second drive unit M2, the third drive unit M3, etc., to perform operations described below, and thus the stacking processing is executed. Note that FIGS. 12 to 20 show scenes in the stacking processing in chronological order, and the larger the figure number of a drawing is, the later the scene shown in the drawing is. In FIGS. 12 to 20, a front view and a side view of the container processing apparatus 1 (the stacking device 1B) are shown side by side to facilitate understanding.

As shown in FIG. 12, a container 90 that is to be subjected to the stacking processing is conveyed to the stacking target location Q (see FIG. 1) through a conveying operation of the conveyor device 40 (the second conveyor device 42). When the container 90 is conveyed to the stacking target location Q, rotation positions of the first endless members 13 are adjusted to positions at which the first locking portions 14 do not interfere with the container 90 to avoid interference between the first locking units 11 and the container 90, and rotation positions of the second endless members 23 are adjusted to positions at which the second locking portions 24 do not interfere with the container 90 to avoid interference between the second locking units 21 and the container 90. Also, when the container 90 is conveyed to the stacking target location Q, the stopper 50 is caused to protrude toward the upper side V1 from the placement plane 40S (the conveyance plane 42S).

Figure 13:
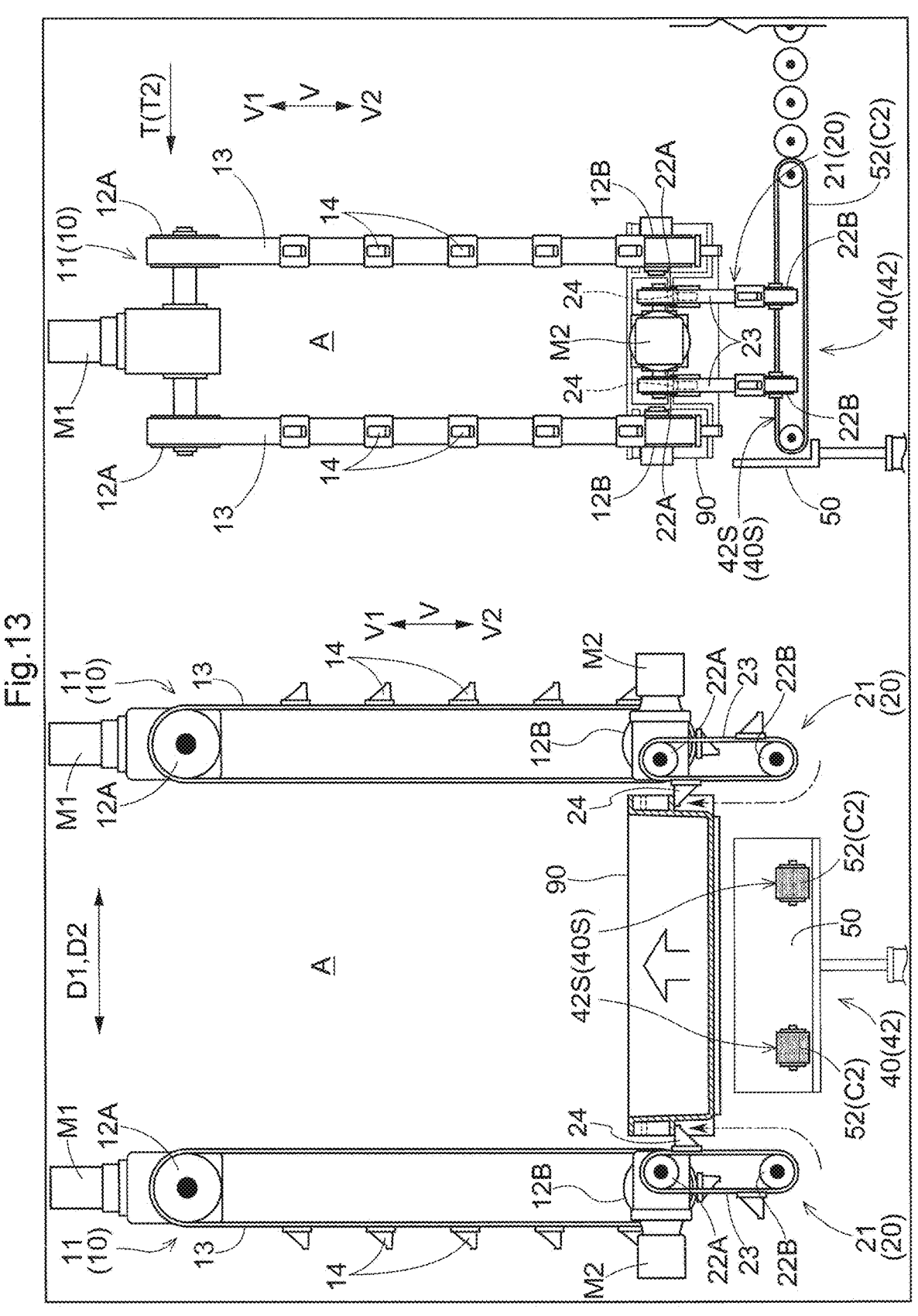
FIG. 13 is a diagram showing the stacking processing according to the embodiment.

As shown in FIG. 13, the pair of second locking units 21 are driven to lift the container 90 placed on the placement plane 40S with use of the second lifting device 20. Specifically, the pair of second endless members 23 included in the pair of second locking units 21 are rotated in such a direction that the second locking portions 24 move upward in the container group arrangement region A to hold and lift the container 90 placed on the placement plane 40S with use of the second lifting device 20. The container 90 is held by the second lifting device 20 with the second locking portions 24 being locked to the second lock target portions 92 of the container 90. The pair of second endless members 23 included in the pair of second locking units 21 are rotated until the container 90 is lifted to a height at which the container 90 can be held by the first lifting device 10 (in other words, a height at which the first locking portions 14 can be locked to the first lock target portions 91 of the container 90).

Figure 14:
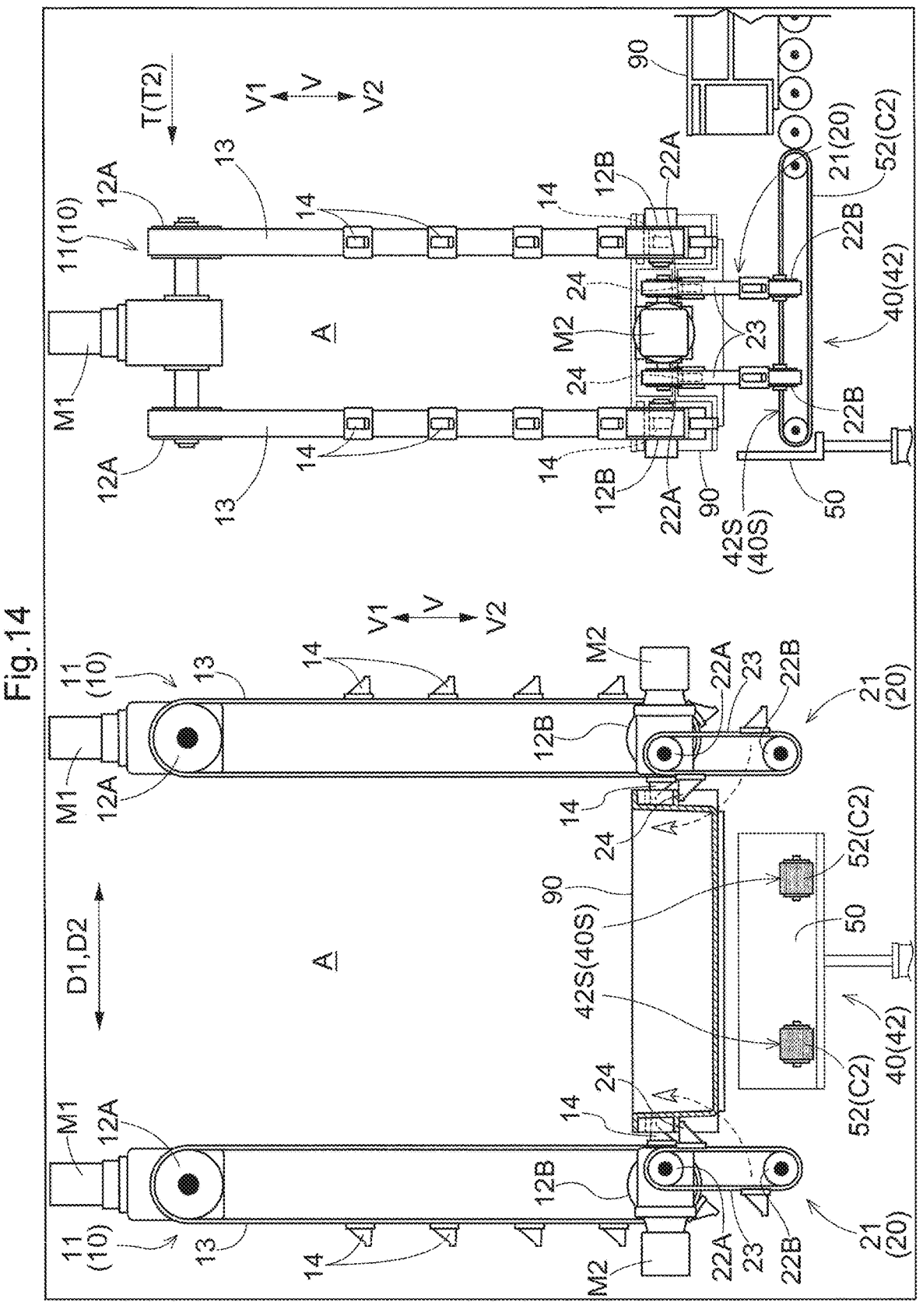
FIG. 14 is a diagram showing the stacking processing according to the embodiment.
Figure 15:
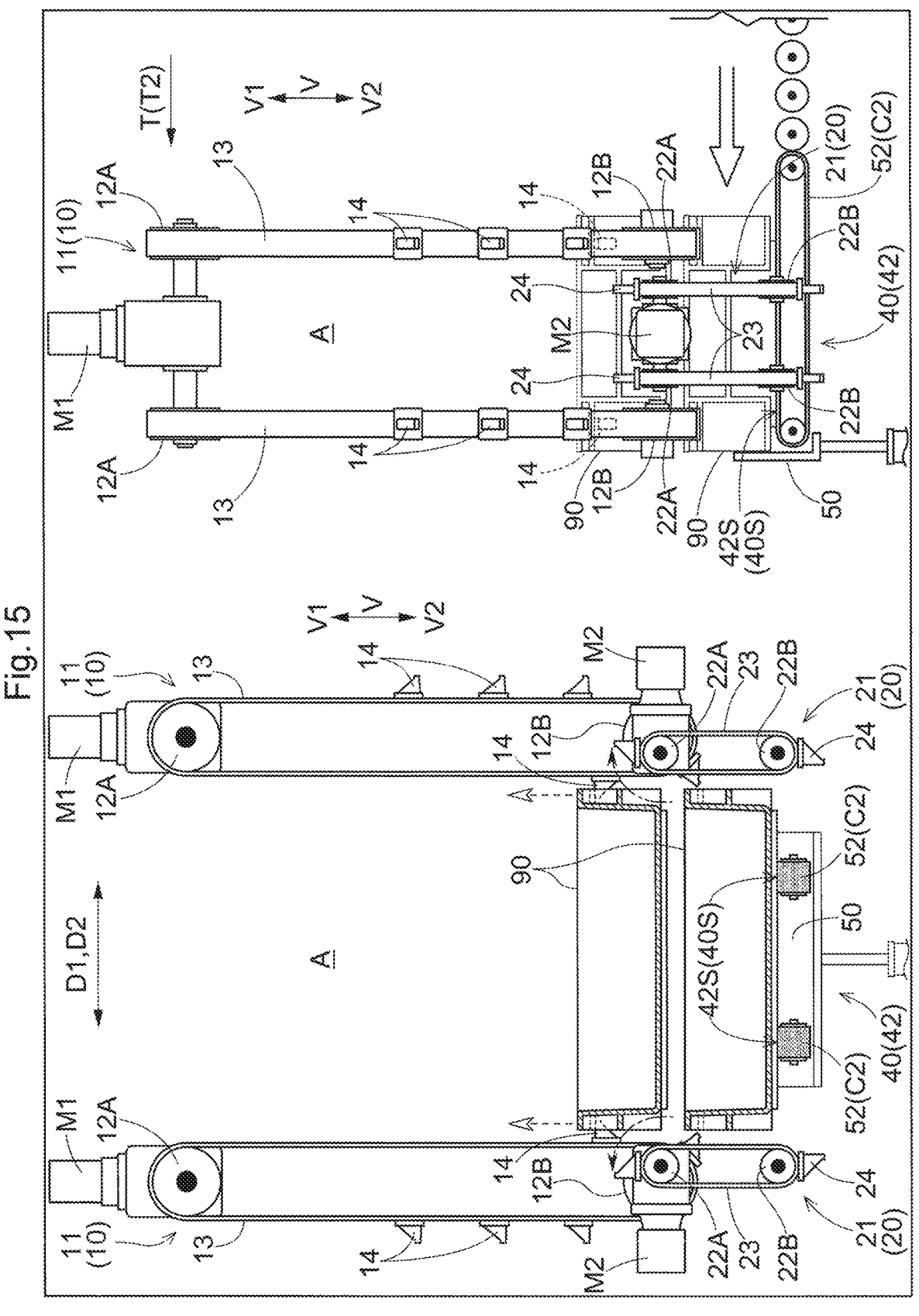
FIG. 15 is a diagram showing the stacking processing according to the embodiment.

Since the pair of second endless members 23 included in the pair of second locking units 21 are rotated until the container 90 is lifted to the height described above, it is possible to lock the first locking portions 14 to the first lock target portions 91 of the container 90 in which the second locking portions 24 are locked to the second lock target portions 92 as shown in FIG. 14 by rotating the pair of first endless members 13 included in the pair of first locking units 11 in such a direction that the first locking portions 14 move upward in the container group arrangement region A, and thus the container 90 can be held by the first lifting device 10. Thereafter, as shown in FIG. 15, the pair of first endless members 13 included in the pair of first locking units 11 are rotated until the container 90 held by the first lifting device 10 is lifted to a height at which the container 90 allows conveyance of a new container 90 that is to be subjected to the stacking processing, and the pair of second endless members 23 included in the pair of second locking units 21 are rotated until the second locking portions 24 come to positions at which the second locking portions 24 do not interfere with the new container 90. In this state, a new container 90 to be subjected to the stacking processing is conveyed. Note that the new container 90 to be subjected to the stacking processing is added as the lowest container 90 to the container 90 or a stacked container group 9 held by the first lifting device 10, and accordingly, the new container 90 to be subjected to the stacking processing will be hereinafter referred to as "the lowest container 90".

Figure 17:
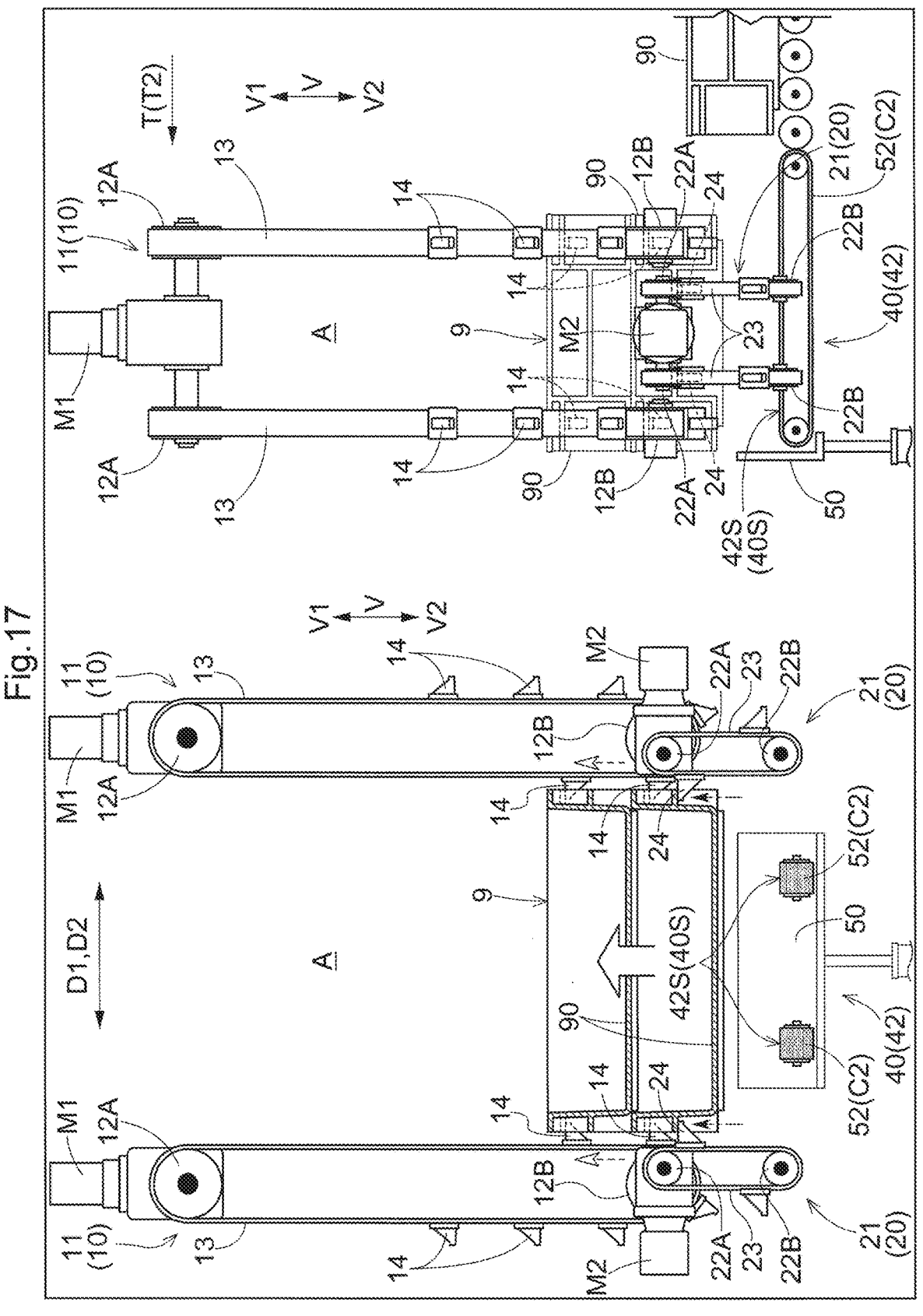
FIG. 17 is a diagram showing the stacking processing according to the embodiment.

As shown in FIG. 16, the pair of second endless members 23 included in the pair of second locking units 21 are rotated in such a direction that the second locking portions 24 move upward in the container group arrangement region A to lift the lowest container 90 placed on the placement plane 40S to a height at which the bottom portion of the container 90 held by the first lifting device 10 is fitted to the upper opening of the lowest container 90. Thereafter, the pair of first endless members 13 included in the pair of first locking units 11 are rotated in such a direction that the first locking portions 14 move upward in the container group arrangement region A, and the pair of second endless members 23 included in the pair of second locking units 21 are rotated in such a direction that the second locking portions 24 move upward in the container group arrangement region A, and consequently, the first locking portions 14 are locked to the first lock target portions 91 of the lowest container 90 in which the second locking portions 24 are locked to the second lock target portions 92 as shown in FIG. 17, and thus the lowest container 90 can be held by the first lifting device 10. Thereafter, the pair of first endless members 13 included in the pair of first locking units 11 are rotated until the stacked container group 9 held by the first lifting device 10 is lifted to a height at which the stacked container group 9 allows conveyance of a new container 90 that is to be subjected to the stacking processing, and the pair of second endless members 23 included in the pair of second locking units 21 are rotated until the second locking portions 24 come to positions at which the second locking portions 24 do not interfere with the new container 90, although this operation is not illustrated.

By repeatedly performing the operations described above, it is possible to sequentially add a container 90 that is to be subjected to the stacking processing as the lowest container 90 to a stacked container group 9 held by the first lifting device 10. Then, when the last container 90 to be subjected to the stacking processing is conveyed as shown in FIG. 18, the stacking processing is completed as described below.

Figure 18:
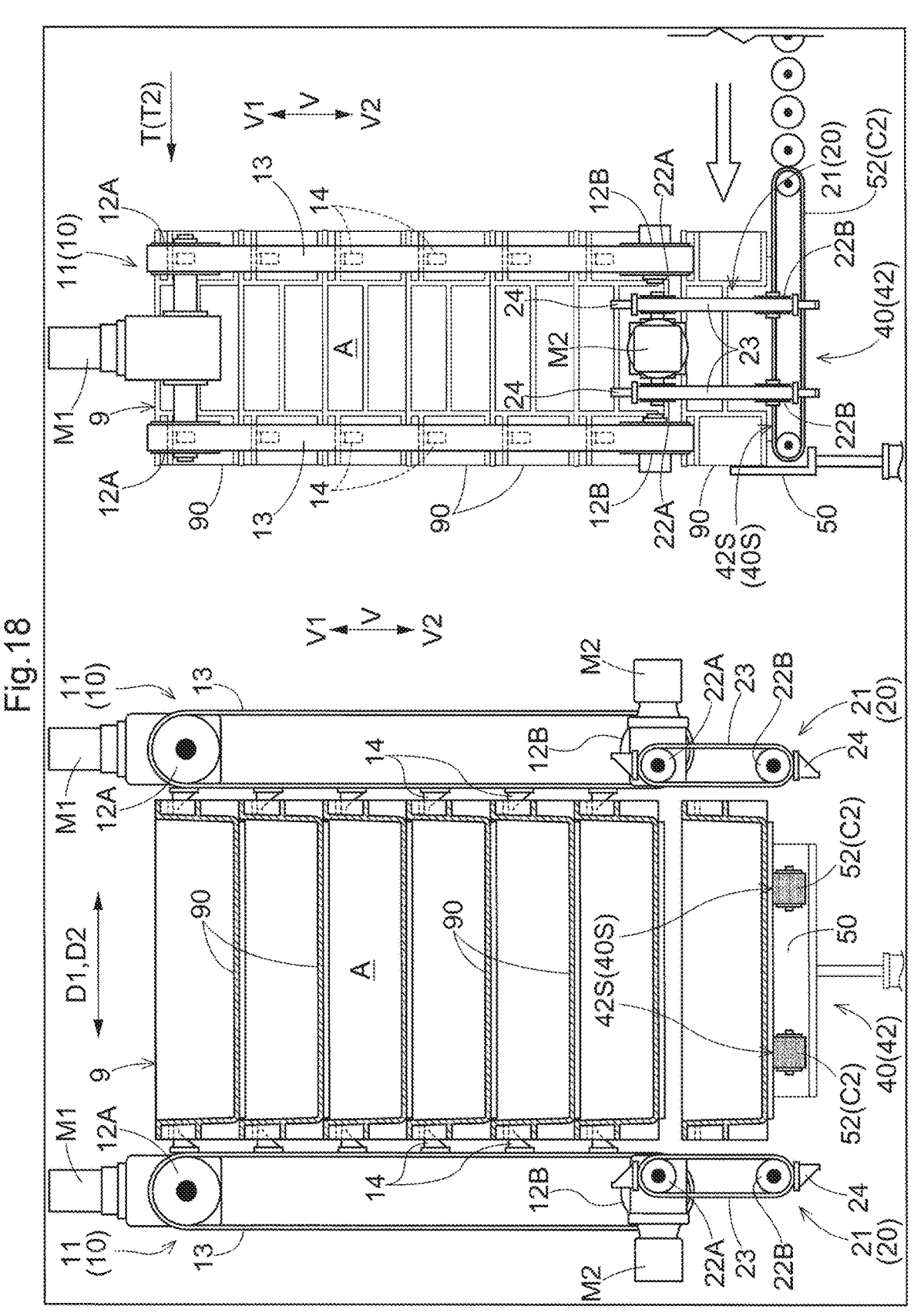
FIG. 18 is a diagram showing the stacking processing according to the embodiment.
Figure 19:
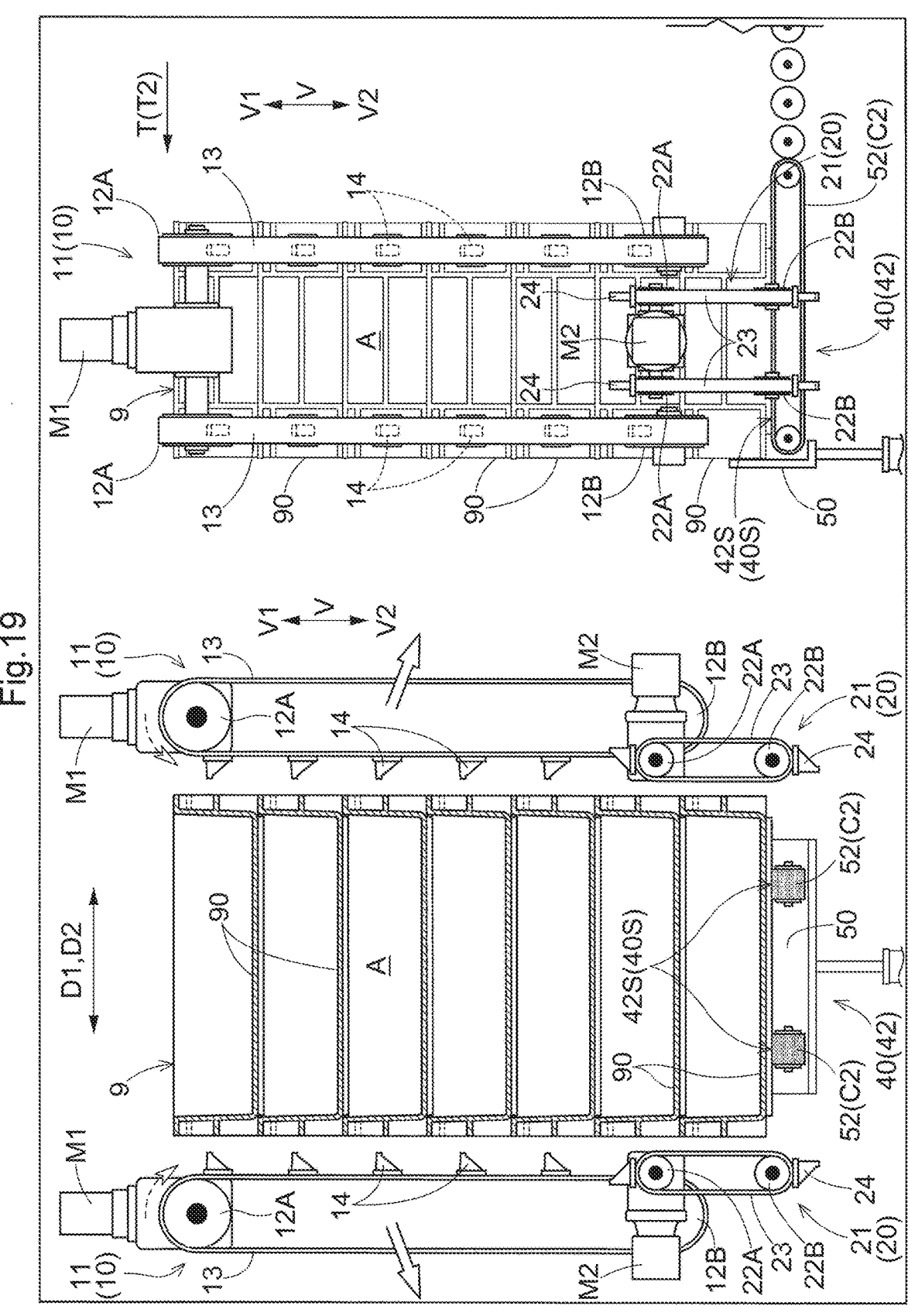
FIG. 19 is a diagram showing the stacking processing according to the embodiment.

After the last container 90 to be subjected to the stacking processing is conveyed as shown in FIG. 18, in the present embodiment, the pair of first endless members 13 included in the pair of first locking units 11 are rotated in such a direction that the first locking portions 14 move downward in the container group arrangement region A until the bottom portion of the lowest container 90 of the stacked container group 9 held by the first lifting device 10 fits into the upper opening of the last container 90, and thereafter, the distance between the pair of first locking units 11 in the first facing direction D1 is increased to avoid interference between the first locking portions 14 fixed to the first endless members 13 and the stacked container group 9 as shown in FIG. 19. Then, the stopper 50 is caused to retract toward the lower side V2 so as not to protrude toward the upper side V1 from the placement plane 40S (the conveyance plane 42S) as shown in FIG. 20, and then the stacked container group 9 generated in the stacking processing is conveyed from the stacking target location Q (see FIG. 1) through a conveying operation of the conveyor device 40 (the second conveyor device 42).

Other Embodiments (1) In the above embodiment, a configuration is described as an example in which the first lifting device 10 includes the third drive unit M3 configured to move the pair of first locking units 11 toward each other and away from each other in the first facing direction D1, and the third drive unit M3 moves the pair of first locking units 11 toward the upper side V1 while moving the pair of first locking units 11 toward each other in the first facing direction D1. However, the present disclosure is not limited to this configuration, and a configuration is also possible in which the third drive unit M3 moves the pair of first locking units 11 toward each other and away from each other in the first facing direction D1 while maintaining the positions of the pair of first locking units 11 in the up-down direction V. Note that a configuration is also possible in which the first lifting device 10 does not include the third drive unit M3, in a case where it is possible to appropriately convey a stacked container group 9 to or from the position between the pair of first locking units 11 even if the distance between the pair of first locking units 11 in the first facing direction D1 is not increased.

(2) In the above embodiment, a configuration is described as an example in which the first facing direction D1 and the second facing direction D2 are parallel to each other, and the conveying direction T is orthogonal to the first facing direction D1 as viewed in the up-down direction. However, the present disclosure is not limited to this configuration, and if the container processing apparatus includes a first retraction mechanism for causing the pair of first locking units 11 to retract from the conveyance path of containers 90 conveyed by the conveyor device 40, for example, it is possible to adopt a configuration in which the first facing direction D1 is parallel to the conveying direction T, and the conveying direction T is orthogonal to the second facing direction D2 as viewed in the up-down direction. Alternatively, if the container processing apparatus includes a second retraction mechanism for causing the pair of second locking units 21 to retract from the conveyance path of containers 90 conveyed by the conveyor device 40, for example, it is possible to adopt a configuration in which the second facing direction D2 is parallel to the conveying direction T, and the conveying direction T is orthogonal to the first facing direction D1 as viewed in the up-down direction. Alternatively, if the container processing apparatus includes both the first retraction mechanism and the second retraction mechanism, for example, it is possible to adopt a configuration in which the first facing direction D1, the second facing direction D2, and the conveying direction T are parallel to each other.

(3) In the above embodiment, a configuration is described as an example in which the distance between the loading section 2 and the unloading section 3 in the travel direction R is set in such a manner that a transport vehicle 60 transferring a stacked container group 9 to the loading section 2 and a transport vehicle 60 receiving a stacked container group 9 from the unloading section 3 can be arranged next to each other in the travel direction R without interfering with each other. However, the present disclosure is not limited to this configuration, and a configuration is also possible in which the distance between the loading section 2 and the unloading section 3 in the travel direction R is set in such a manner that two transport vehicles 60 cannot be arranged as described above (in other words, the distance is shorter than a distance that allows two transport vehicles 60 to be arranged as described above).

(4) In the above embodiment, a configuration is described as an example in which the first upstream section 41A is configured in such a manner that a plurality of stacked container groups 9 can be arranged next to each other in the conveying direction, and the stacked container groups 9 can be conveyed and stopped without affecting the unstacking processing performed by the unstacking device 1A. However, the present disclosure is not limited to this configuration, and a configuration is also possible in which the first upstream section 41A is configured in such a manner that a plurality of stacked container groups 9 can be arranged next to each other in the conveying direction, but the stacked container groups 9 cannot be conveyed and stopped without affecting the unstacking processing performed by the unstacking device 1A. Alternatively, a configuration is also possible in which the first upstream section 41A is configured in such a manner that a plurality of stacked container groups 9 cannot be arranged next to each other in the conveying direction, and only one stacked container group 9 can be arranged in the first upstream section 41A.

(5) In the above embodiment, a configuration is described as an example in which the second downstream section 42B is configured in such a manner that a plurality of stacked container groups 9 can be arranged next to each other in the conveying direction, and the stacked container groups 9 can be conveyed and stopped without affecting the stacking processing performed by the stacking device 1B. However, the present disclosure is not limited to this configuration, and a configuration is also possible in which the second downstream section 42B is configured in such a manner that a plurality of stacked container groups 9 can be arranged next to each other in the conveying direction, but the stacked container groups 9 cannot be conveyed and stopped without affecting the stacking processing performed by the stacking device 1B. Alternatively, a configuration is also possible in which the second downstream section 42B is configured in such a manner that a plurality of stacked container groups 9 cannot be arranged next to each other in the conveying direction, and only one stacked container group 9 can be arranged in the second downstream section 42B.

(6) In the above embodiment, a configuration is described as an example in which at least the portion of the first conveyor device 41 including the unstacking target location P is constituted by the roller conveyor C1, and at least the portion of the second conveyor device 42 including the stacking target location Q is constituted by the belt conveyor C2. However, the present disclosure is not limited to this configuration, and a configuration is also possible in which the portion of the first conveyor device 41 including the unstacking target location P is constituted by a conveyor of a type other than the roller conveyor C1 (e.g., a belt conveyor C2). Also, the portion of the second conveyor device 42 including the stacking target location Q may be constituted by a conveyor of a type other than the belt conveyor C2 (e.g., a roller conveyor C1).

(7) In the above embodiment, a configuration is described as an example in which the stopper 50 is provided at the position corresponding to the downstream edge of the stacking target location Q in the second conveying direction T2. However, the present disclosure is not limited to this configuration, and a configuration is also possible in which the stopper 50 is not provided at the position corresponding to the downstream edge of the stacking target location Q in the second conveying direction T2.

(8) In the above embodiment, a configuration is described as an example in which the weighing section 7 is provided between the work station 80 and the stacking device 1B on the conveyance path of the second conveyor device 42. However, the present disclosure is not limited to this configuration, and a configuration is also possible in which the weighing section 7 is not provided between the work station 80 and the stacking device 1B on the conveyance path of the second conveyor device 42.

(9) In the above embodiment, a configuration is described as an example in which at least one of the loading section 2 and the unloading section 3 is the target section 4, and the target section 4 includes the power supply portion 5. However, the present disclosure is not limited to this configuration, and a configuration is also possible in which both the loading section 2 and the unloading section 3 do not include the power supply portion 5.

(10) In the above embodiment, a configuration is described as an example in which a single container processing apparatus 1 executes only one of the stacking processing and the unstacking processing (specifically, the container processing apparatus 1 used as the unstacking device 1A executes only the unstacking processing, and the container processing apparatus 1 used as the stacking device 1B executes only the stacking processing). However, the present disclosure is not limited to this configuration, and a configuration is also possible in which a single container processing apparatus 1 executes both the stacking processing and the unstacking processing. In this case, the conveyance path of containers 90 and stacked container groups 9 in the container processing facility 100 is set in such a manner that, when the container processing apparatus 1 executes the stacking processing, a plurality of containers 90 to be subjected to the stacking processing are conveyed to the container processing apparatus 1, and when the container processing apparatus 1 executes the unstacking processing, a stacked container group 9 to be subjected to the unstacking processing is conveyed to the container processing apparatus 1.

(11) In the above embodiment, a configuration is described as an example in which the container processing facility 100 includes the loading section 2 and the unloading section 3 separately from each other. However, the present disclosure is not limited to this configuration, and a configuration is also possible in which the container processing facility 100 includes a loading/unloading section that can be used as both the loading section 2 and the unloading section 3 in accordance with the state of the container processing facility 100.

(12) Note that the configurations disclosed in the embodiments described above can be applied in combination with configurations disclosed in the other embodiments (including combinations of embodiments described as the other embodiments) so long as no contradiction arises. The embodiments disclosed in the present specification including the other configurations are merely examples in all aspects. Therefore, it is possible to make various modifications as appropriate within a scope not departing from the gist of the present disclosure.

Summary of the Above Embodiment

The following describes a summary of the container processing apparatus described above.

A container processing apparatus configured to execute at least one of: stacking processing for generating a stacked container group by sequentially stacking a plurality of containers; and unstacking processing for sequentially separating the containers from the stacked container group composed of the plurality of containers stacked on each other, the container processing apparatus including: a conveyor device configured to convey the containers placed on a placement plane in a conveying direction that intersects an up-down direction; a first lifting device positioned in such a manner as to hold, lift, and lower the containers above the placement plane and configured to hold, lift, and lower the stacked container group; and a second lifting device positioned in such a manner as to hold, lift, and lower the containers above the placement plane and configured to hold, lift, and lower a lowest container of the stacked container group, wherein the container processing apparatus further includes a container group arrangement region in which the stacked container group is arranged above the placement plane, the first lifting device includes: a pair of first locking units facing each other and sandwiching the container group arrangement region therebetween; and a first drive unit configured to drive the pair of first locking units, the first locking units each include a first endless member wound around a pair of first rotary members spaced apart from each other in the up-down direction; and a plurality of first locking portions fixed to an outer circumferential portion of the first endless member at a constant interval along an extending direction of the first endless member, the first drive unit drives a pair of the first endless members included in the pair of first locking units in such a manner that the first endless members rotate synchronously with each other, the second lifting device includes: a pair of second locking units facing each other and sandwiching the container group arrangement region therebetween; and a second drive unit configured to drive the pair of second locking units, the second locking units each include: a second endless member wound around a pair of second rotary members spaced apart from each other in the up-down direction; and a second locking portion fixed to an outer circumferential portion of the second endless member, the second drive unit drives a pair of the second endless members included in the pair of second locking units in such a manner that the second endless members rotate synchronously with each other, each first locking unit of the pair of first locking units is positioned in such a manner that the plurality of first locking portions are respectively locked to side surfaces of the plurality of containers included in the stacked container group arranged in the container group arrangement region, in a state where the first locking portions are lined up along the up-down direction and face the container group arrangement region, each second locking unit of the pair of second locking units is positioned in such a manner that the second locking portion is locked to a side surface of the lowest container of the stacked container group arranged in the container group arrangement region, in a state where the second locking portion faces the container group arrangement region, and the first drive unit and the second drive unit are configured to operate independently of each other.

According to this configuration, it is possible to collectively hold, lift, and lower the plurality of containers included in the stacked container group with use of the first lifting device, and hold, lift, and lower only the lowest container of the stacked container group with use of the second lifting device. Moreover, the first drive unit and the second drive unit are configured to operate independently of each other in this configuration, and therefore, the pair of first locking units of the first lifting device and the pair of second locking units of the second lifting device can be caused to operate independently of each other. Accordingly, when the lowest container of the stacked container group held above the conveyor device by the first lifting device is to be placed onto the placement plane (i.e., the unstacking processing) or when a container placed on the placement plane is to be added as the lowest container to the stacked container group held above the conveyor device by the first lifting device (i.e., the stacking processing), it is possible to smoothly transfer the lowest container between the stacked container group and the conveyor device with use of the second lifting device.

As described above, according to this configuration, it is possible to smoothly transfer the lowest container between the conveyor device and a stacked container group held above the conveyor device in the stacking processing or the unstacking processing, even if the container processing apparatus does not include a lifting table that is lifted and lowered while supporting the lowest container of a stacked container group.

Here, it is preferable that each container has first target side surfaces to which the first locking portions are locked and second target side surfaces to which the second locking portions are locked, rotation axes of the pair of first rotary members extend along a horizontal direction and a direction parallel to the first target side surfaces, and rotation axes of the pair of second rotary members extend along a horizontal direction and a direction parallel to the second target side surfaces.

According to this configuration, the first locking portions can move toward or away from the first target side surfaces of the containers along outer circumferential surfaces of the first rotary members at the positions of the first rotary members as the first endless members rotate. Also, the second locking portions can move toward or away from the second target side surfaces of a container along outer circumferential surfaces of the second rotary members at the positions of the second rotary members as the second endless members rotate. Therefore, it is possible to move the first locking portions so as to be locked to the first target side surfaces or unlocked therefrom by rotating the first endless members, without changing positions of the pair of first locking units as a whole. Also, it is possible to move the second locking portions so as to be locked to the second target side surfaces or unlocked therefrom by rotating the second endless members, without changing positions of the pair of second locking units as a whole.

As described above, according to this configuration, it is possible to lock the first locking portions to side surfaces of containers and unlock the first locking portions therefrom by rotating the first endless members, and it is possible to lock the second locking portions to side surfaces of a container and unlock the second locking portions therefrom by rotating the second endless members. Therefore, there is no need to provide a complex mechanism, and it is possible to appropriately perform the unstacking processing by rotating the first endless members and the second endless members in such a manner that the first locking portions and the second locking portions transition from a state where the first locking portions are locked to side surfaces of the lowest container of a stacked container group to a state where the second locking portions are locked to side surfaces of the container, and then to a state where both the first locking portions and the second locking portions are unlocked from the side surfaces of the container. Also, there is no need to provide a complex mechanism, and it is possible to appropriately perform the stacking processing by rotating the first endless members and the second endless members in such a manner that the first locking portions and the second locking portions transition from a state where neither the first locking portions nor the second locking portions are locked to side surfaces of a container placed on the placement plane to a state where the second locking portions are locked to side surfaces of the container, and then to a state where the first locking portions are locked to side surfaces of the container.

Also, it is preferable that, out of the pair of first rotary members spaced apart from each other in the up-down direction, a first rotary member located on a lower side is referred to as a lower first rotary member, and out of the pair of second rotary members spaced apart from each other in the up-down direction, a second rotary member located on the lower side is referred to as a lower second rotary member, and the lower second rotary member is located on the lower side relative to the lower first rotary member.

According to this configuration, the second lifting device can lift and lower a container in a region that is on the lower side in the up-down direction relative to a lowest position at which the first lifting device can hold the container. Therefore, after the lowest container of a stacked container group is released from the first lifting device in the unstacking processing, the container can be lowered and placed onto the placement plane by the second lifting device, and thus the unstacking processing can be performed appropriately. Also, in the stacking processing, a container placed on the placement plane can be lifted by the second lifting device and added as the lowest container to a stacked container group held by the first lifting device, and thus the stacking processing can be performed appropriately.

Also, it is preferable that the first locking units are configured in such a manner that, when the first locking portions move downward as the first endless members rotate, the first locking portions are unlocked from the side surfaces of the lowest container before the lowest container is placed on the placement plane, and the second locking units are configured in such a manner that, when the second locking portions move downward as the second endless members rotate, the second locking portions are unlocked from the side surfaces of the lowest container at the same time as the lowest container is placed on the placement plane.

According to this configuration, when the first locking portions move downward as the first endless members rotate, the first locking portions are unlocked from the side surfaces of the lowest container before the lowest container is placed on the placement plane, and accordingly, the lowest container can be separated downward from the group of other containers held by the first lifting device and placed onto the placement plane in the unstacking processing. Moreover, according to this configuration, when the second locking portions move downward as the second endless members rotate, the second locking portions are unlocked from the side surfaces of the lowest container at the same time as the lowest container is placed on the placement plane, and accordingly, the lowest container separated downward from the group of other containers held by the first lifting device can be lowered to the placement plane or a position near the placement plane while being held by the second lifting device. Therefore, the unstacking processing can be performed smoothly.

Also, according to this configuration, the first locking units and the second locking units are configured as described above, and therefore, in the stacking processing, it is possible to cause the first lifting device to hold a container placed on the placement plane as the lowest container of a stacked container group by locking the second locking portions to side surfaces of the container, and then lifting the container with use of the second lifting device to a position at which the first locking portions can be locked to side surfaces of the container. Therefore, the stacking processing can be performed smoothly.

It is preferable that the pair of first locking units face each other in a first facing direction, and the first lifting device further includes a third drive unit configured to move the pair of first locking units toward each other and away from each other in the first facing direction.

According to this configuration, when a stacked container group that is to be subjected to the unstacking processing is conveyed to a position between the pair of first locking units, it is possible to avoid interference between the stacked container group and the first locking portions relatively easily by moving the pair of first locking units away from each other. Also, by moving the pair of first locking units toward each other after the stacked container group is conveyed to the position between the pair of first locking units, it is possible to lock the first locking portions to both side surfaces of the containers included in the stacked container group in the first facing direction and appropriately start the unstacking processing. Moreover, according to this configuration, when a stacked container group generated in the stacking processing is conveyed from the position between the pair of first locking units, it is possible to avoid interference between the stacked container group and the first locking portions relatively easily by moving the pair of first locking units away from each other after the stacking processing is finished.

In the configuration in which the first lifting device includes the third drive unit as described above, it is preferable that the third drive unit is configured to move the pair of first locking units upward while moving the pair of first locking units toward each other in the first facing direction.

According to this configuration, when the first locking portions are locked to respective side surfaces of containers included in a stacked container group (a stacked container group arranged between the pair of first locking units, the same applies hereinafter) while the pair of first locking units are moved toward each other, the pair of first locking units move diagonally upward, and accordingly, the first locking portions can be moved toward lock target portions of the side surfaces of the containers from diagonally below. Also, when the first locking portions are unlocked from the side surfaces of the containers included in the stacked container group while the pair of first locking units are moved away from each other, the pair of first locking units move diagonally downward, and accordingly, the first locking portions can be separated from the lock target portions of the side surfaces of the containers diagonally downward. Therefore, it is easy to appropriately lock the first locking portions to the side surfaces of the containers and appropriately unlock the first locking portions therefrom.

Also, according to this configuration, when the lowest container of a stacked container group is separated from the stacked container group by moving the pair of first locking units toward each other after the stacked container group to be subjected to the unstacking processing is conveyed to the position between the pair of first locking units and then rotating the first endless members to move the first locking portions upward and lift containers (hereinafter referred to as "target containers") other than the lowest container of the stacked container group, the pair of first locking units move upward as they move toward each other, and accordingly, the first locking portions can move upward in such a manner as to get closer to lock target portions of side surfaces of the target containers, or can be locked to the side surfaces of the target containers and lift the target containers. Therefore, the time it takes to lift the target containers to a height sufficient to convey the lowest container from the position between the pair of locking units can be reduced when compared with a case where the third drive unit moves the pair of first locking units toward each other while maintaining positions of the first locking units in the up-down direction.

In the container processing apparatus having any one of the above-described configurations, it is preferable that a first facing direction in which the pair of first locking units face each other is parallel to a second facing direction in which the pair of second locking units face each other, and the conveying direction is orthogonal to the first facing direction as viewed in the up-down direction.

According to this configuration, it is possible to convey containers in the conveying direction with use of the conveyor device while avoiding interference between the containers and the pair of first locking units and the pair of second locking units without the need to provide a complex mechanism for retracting the pair of first locking units and the pair of second locking units from the conveyance path along which the containers are conveyed by the conveyor device.

The container processing apparatus according to the present disclosure is only required to achieve at least one of the effects described above.

DESCRIPTION OF REFERENCE SIGNS

1: Container processing apparatus
9: Stacked container group
10: First lifting device
11: First locking unit
12: First rotary member
12B: Lower first rotary member
13: First endless member
14: First locking portion
20: Second lifting device
21: Second locking unit
22: Second rotary member
22B: Lower second rotary member
23: Second endless member
24: Second locking portion
40: Conveyor device
40S: Placement plane
90: Container
A: Container group arrangement region
D1: First facing direction
D2: Second facing direction
H: Horizontal direction
M1: First drive unit
M2: Second drive unit
M3: Third drive unit
S: Side surface
S1: First target side surface S2: Second target side surface
T: Conveying direction
V: Up-down direction
V1: Upper side
V2: Lower side
X1: First rotation axis (rotation axis of first rotary member)
X2: Second rotation axis (rotation axis of second rotary member)

The invention claimed is:

1. A container processing apparatus configured to execute at least one of: stacking processing for generating a stacked container group by sequentially stacking a plurality of containers; and unstacking processing for sequentially separating the containers from the stacked container group comprised of the plurality of containers stacked on each other, the container processing apparatus comprising:

a conveyor device configured to convey the containers placed on a placement plane in a conveying direction that intersects an up-down direction;

a first lifting device positioned in such a manner as to hold, lift, and lower the containers above the placement plane and configured to hold, lift, and lower the stacked container group; and a second lifting device positioned in such a manner as to hold, lift, and lower the containers above the placement plane and configured to hold, lift, and lower a lowest container of the stacked container group, and wherein:

the first lifting device and the second lifting device are aligned along a common vertical axis, the container processing apparatus further comprises a container group arrangement region wherein the stacked container group is arranged above the placement plane, the first lifting device comprises:

a pair of first locking units facing each other and sandwiching the container group arrangement region therebetween; and a first drive unit configured to drive the pair of first locking units, the first locking units each comprise:

a first endless member wound around a pair of first rotary members spaced apart from each other in the up-down direction; and a plurality of first locking portions fixed to an outer circumferential portion of the first endless member at a constant interval along an extending direction of the first endless member, the first drive unit drives a pair of the first endless members included in the pair of first locking units in such a manner that the first endless members rotate synchronously with each other, the second lifting device comprises:

a pair of second locking units facing each other and sandwiching the container group arrangement region therebetween; and a second drive unit configured to drive the pair of second locking units, the second locking units each comprise:

a second endless member wound around a pair of second rotary members spaced apart from each other in the up-down direction; and a second locking portion fixed to an outer circumferential portion of the second endless member, the second drive unit drives a pair of the second endless members included in the pair of second locking units in such a manner that the second endless members rotate synchronously with each other, each first locking unit of the pair of first locking units is positioned in such a manner that the plurality of first locking portions are respectively locked to side surfaces of the plurality of containers included in the stacked container group arranged in the container group arrangement region, in a state where the first locking portions are lined up along the up-down direction and face the container group arrangement region, each second locking unit of the pair of second locking units is positioned in such a manner that the second locking portion is locked to a side surface of the lowest container of the stacked container group arranged in the container group arrangement region, in a state where the second locking portion faces the container group arrangement region, and the first drive unit and the second drive unit are configured to operate independently of each other.

2. The container processing apparatus according to claim 1, wherein each container has first target side surfaces to which the first locking portions are locked and second target side surfaces to which the second locking portions are locked, wherein rotation axes of the pair of first rotary members extend along a horizontal direction and a direction parallel to the first target side surfaces, and wherein rotation axes of the pair of second rotary members extend along a horizontal direction and a direction parallel to the second target side surfaces.

3. The container processing apparatus according to claim 1, wherein, out of the pair of first rotary members spaced apart from each other in the up-down direction, a first rotary member located on a lower side is referred to as a lower first rotary member, and out of the pair of second rotary members spaced apart from each other in the up-down direction, a second rotary member located on the lower side is referred to as a lower second rotary member, and wherein the lower second rotary member is located on the lower side relative to the lower first rotary member.

4. The container processing apparatus according to claim 1, wherein the first locking units are configured in such a manner that, when the first locking portions move downward as the first endless members rotate, the first locking portions are unlocked from the side surfaces of the lowest container before the lowest container is placed on the placement plane, and wherein the second locking units are configured in such a manner that, when the second locking portions move downward as the second endless members rotate, the second locking portions are unlocked from the side surfaces of the lowest container at the same time as the lowest container is placed on the placement plane.

5. The container processing apparatus according to claim 1, wherein the pair of first locking units face each other in a first facing direction, and wherein the first lifting device further comprises a third drive unit configured to move the pair of first locking units toward each other and away from each other in the first facing direction.

6. The container processing apparatus according to claim 1, wherein a first facing direction in which the pair of first locking units face each other is parallel to a second facing direction in which the pair of second locking units face each other, and wherein the conveying direction is orthogonal to the first facing direction as viewed in the up-down direction.

7. The container processing apparatus according to claim 1, wherein the first lifting device is disposed vertically above the second lifting device.

8. A container processing apparatus configured to execute at least one of: stacking processing for generating a stacked container group by sequentially stacking a plurality of containers; and unstacking processing for sequentially separating the containers from the stacked container group comprised of the plurality of containers stacked on each other, the container processing apparatus comprising:

a conveyor device configured to convey the containers placed on a placement plane in a conveying direction that intersects an up-down direction;

a first lifting device positioned in such a manner as to hold, lift, and lower the containers above the placement plane and configured to hold, lift, and lower the stacked container group; and a second lifting device positioned in such a manner as to hold, lift, and lower the containers above the placement plane and configured to hold, lift, and lower a lowest container of the stacked container group, and wherein:

the container processing apparatus further comprises a container group arrangement region wherein the stacked container group is arranged above the placement plane, the first lifting device comprises:

a pair of first locking units facing each other and sandwiching the container group arrangement region therebetween; and a first drive unit configured to drive the pair of first locking units, the first locking units each comprise:

a first endless member wound around a pair of first rotary members spaced apart from each other in the up-down direction; and a plurality of first locking portions fixed to an outer circumferential portion of the first endless member at a constant interval along an extending direction of the first endless member, the first drive unit drives a pair of the first endless members included in the pair of first locking units in such a manner that the first endless members rotate synchronously with each other, the second lifting device comprises:

a pair of second locking units facing each other and sandwiching the container group arrangement region therebetween; and a second drive unit configured to drive the pair of second locking units, the second locking units each comprise:

a second endless member wound around a pair of second rotary members spaced apart from each other in the up-down direction; and a second locking portion fixed to an outer circumferential portion of the second endless member, the second drive unit drives a pair of the second endless members included in the pair of second locking units in such a manner that the second endless members rotate synchronously with each other, each first locking unit of the pair of first locking units is positioned in such a manner that the plurality of first locking portions are respectively locked to side surfaces of the plurality of containers included in the stacked container group arranged in the container group arrangement region, in a state where the first locking portions are lined up along the up-down direction and face the container group arrangement region, each second locking unit of the pair of second locking units is positioned in such a manner that the second locking portion is locked to a side surface of the lowest container of the stacked container group arranged in the container group arrangement region, in a state where the second locking portion faces the container group arrangement region, and the first drive unit and the second drive unit are configured to operate independently of each other, the pair of first locking units face each other in a first facing direction, the first lifting device further comprises a third drive unit configured to move the pair of first locking units toward each other and away from each other in the first facing direction, and the third drive unit is configured to move the pair of first locking units upward while moving the pair of first locking units toward each other in the first facing direction.

\* \* \* \* \*